US012713060B2

(12) United States Patent
Zhang et al.

(10) Patent No.: US 12,713,060 B2
(45) Date of Patent: Aug. 18, 2026

(54) CODING VIDEO DATA USING ADAPTIVE AFFINE BLOCK PREDICTION

(71) Applicant: QUALCOMM Incorporated, San Diego, CA (US)

(72) Inventors: Zhi Zhang, Munich (DE); Han Huang, San Diego, CA (US); Yan Zhang, San Diego, CA (US); Patrick Garus, Munich (DE); Vadim Seregin, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 378 days.

(21) Appl. No.: 18/481,055

(22) Filed: Oct. 4, 2023

(65) Prior Publication Data

US 2024/0129525 A1 Apr. 18, 2024

Related U.S. Application Data

(60) Provisional application No. 63/379,043, filed on Oct. 11, 2022.

(51) Int. Cl.
*H04N 19/583* (2014.01)
*H04N 19/176* (2014.01)
(Continued)

(52) U.S. Cl.
CPC ......... *H04N 19/583* (2014.11); *H04N 19/176* (2014.11); *H04N 19/186* (2014.11); *H04N 19/70* (2014.11)

(58) Field of Classification Search
CPC .................................................... H04N 19/583
(Continued)

(56) References Cited

U.S. PATENT DOCUMENTS

2021/0092366 A1* 3/2021 Liu ...................... H04N 19/132
2021/0160525 A1* 5/2021 Zhang .................. H04N 19/184
(Continued)

FOREIGN PATENT DOCUMENTS

WO 2020242350 A2 12/2020

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
(Continued)

*Primary Examiner* — Yulin Sun
(74) *Attorney, Agent, or Firm* — Shumaker & Sieffert, P. A.

(57) ABSTRACT

An example device for decoding video data includes: a memory configured to store video data; and a processing system comprising one or more processors implemented in circuitry, the processing system being configured to: determine whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, perform sub-block-based affine motion compensation to form a prediction block for the block; in response to determining that the motion information is for the individual pixels, perform pixel-based affine motion compensation to form the prediction block for the block; and decode the block using the prediction block.

34 Claims, 10 Drawing Sheets

(51) Int. Cl.
*H04N 19/186* (2014.01)
*H04N 19/70* (2014.01)

(58) Field of Classification Search
USPC .................................................... 375/240.12
See application file for complete search history.

(56) References Cited

U.S. PATENT DOCUMENTS

| | | | | |
|---|---|---|---|---|
| 2021/0266588 A1* | 8/2021 | Liu | ...................... | H04N 19/157 |
| 2022/0264094 A1* | 8/2022 | Solovyev | ............. | H04N 19/523 |
| 2023/0171421 A1* | 6/2023 | Galpin | ................. | H04N 19/577 375/240.16 |

OTHER PUBLICATIONS

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Lin Z-Y., et al., "CE10.2.1: OBMC", JVET-L0101-v1, Joint Video Experts Team (JVET) of ITU-T SG 16 WP 3 and ISO/ IEC JTC 1/SC 29/WG 11, 12th Meeting: Macao, CN, Oct. 3-12, 2018, pp. 1-7, No. m44107, Oct. 1, 2018, XP030191474.

Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, XP030200865, pp. 1-14.

Zhang Z., et al., "EE2-2.5: Pixel Based Affine Motion Compensation", JVET-AC0158-v3, Joint Video Experts Team (JVET) of ITU-T SG 16 WP 3 and ISO/IEC JTC 1/SC 29, 29th Meeting, by teleconference, Jan. 11-20, 2023, pp. 1-3.

Zhang Z., et al., "Non-EE2: Pixel Based Affine Motion Compensation", JVET-AB0168-v3, Joint Video Experts Team (JVET) of ITU-T SG 16 WP 3 and ISO/IEC JTC 1/SC 29, 28th Meeting, Mainz, DE, Oct. 20-28, 2022, pp. 1-2.

Heithausen C., et al., "Motion Compensation with Higher Order Motion Models for HEVC", IEEE International Conference on Acoustics, Speech and Signal Processing, IEEE, Apr. 19, 2015, pp. 1438-1442.

International Search Report and Written Opinion—PCT/US2023/076167—ISA/EPO—Jan. 31, 2024.

Kim K., et al., (Wilus Inc): "Non-EE2: Simplification Methods for OBMC", Joint Video Experts Team (JVET) of ITU-T SG 16 WP 3 and ISO/IEC JTC 1/SC 29, 27th Meeting, By Teleconference, Jul. 13, 2022-Jul. 22, 2022, No. JVET-AA0143-v4, m60119, Jul. 19, 2022, 4 Pages.

Lin Z-Y., et al., "CE10-Related: Combined Test of Multi-hypothesis Inter Prediction and OBMC", Joint Video Experts Team (JVET) of ITU-T SG 16 WP 3 and ISO/IEC JTC 1/SC 29/WG 11, 13th Meeting, Marrakech, MA, Jan. 9, 2019-Jan. 18, 2019, No. JVET-M0792-v2, Jan. 13, 2019, 4 Pages.

Luo J., et al., (InterdigitaL): "CE2-Related: Prediction Refinement with Optical Flow for Affine Mode", Joint Video Experts Team (JVET) of ITU-T SG 16 WP 3 and ISO/IEC JTC 1/SC 29/WG 11,14th Meeting, Geneva, CH, Mar. 19, 2019-Mar. 27, 2019, No. JVET-N0236-r5, Mar. 26, 2019, 7 Pages.

Zhang Z., et al., (QUALCOMM): "Non-EE2: Pixel Based Affine Motion Compensation", Joint Video Experts Team (JVET) of ITU-T SG 16 WP 3 and ISO/IEC JTC 1/SC 29, 28th Meeting, Mainz, DE, Oct. 20, 2022-Oct. 28, 2022, No. JVET-AB0168-v1, m60956, Oct. 14, 2022, 2 Pages.

* cited by examiner

CODING VIDEO DATA USING ADAPTIVE AFFINE BLOCK PREDICTION

This application claims the benefit of U.S. Provisional Application No. 63/379,043, filed Oct. 11, 2022, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to video coding using affine motion compensation. Affine motion compensation is an inter-prediction technique including the use of motion information, e.g., two or three motion vectors. In some cases, affine motion compensation may be applied on a sub-block basis, and in some cases, affine motion compensation may be applied on an individual pixel basis. When applied on a sub-block basis, it is assumed that the sub-blocks have sizes larger than a single pixel. According to the techniques of this disclosure, a determination of whether motion information of a block of video data applies to sub-blocks or to individual pixels may be made when the block is to be predicted using affine motion information. When the motion information is for sub-blocks (having sizes larger than individual pixels), a video coder (encoder or decoder) may perform affine motion compensation on a sub-block basis, whereas when the motion information is for the individual pixels, the video coder may perform affine motion compensation on an individual pixel basis.

To determine whether the motion information is for the sub-blocks or the pixels, a video decoder may determine whether overlapped block motion compensation (OBMC) is to be applied to the block. In this manner, processing tasks associated with sub-blocks larger than individual pixels but not individual pixels themselves can be disabled implicitly, e.g., without coding a syntax element indicating whether the processing tasks are enabled or disabled. Thus, processing efficiency may be improved and a bitrate associated with a bitstream including coded video data may be reduced.

In one example, a method of decoding video data includes determining whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, performing sub-block-based affine motion compensation to form a prediction block for the block; in response to determining that the motion information is for the individual pixels, performing pixel-based affine motion compensation to form the prediction block for the block; and decoding the block using the prediction block.

In another example, a device for decoding video data includes a memory configured to store video data; and a processing system comprising one or more processors implemented in circuitry, the processing system being configured to: determine whether motion information of a block of the video data is for sub-blocks of the block larger than individual pixels of the block or for the individual pixels, the block being associated with data indicating that the block is to be predicted using affine motion compensation; in response to determining that the motion information of the block is for the sub-blocks, perform sub-block-based affine motion compensation to form a prediction block for the block; in response to determining that the motion information is for the individual pixels, perform pixel-based affine motion compensation to form the prediction block for the block; and decode the block using the prediction block.

In another example, a device for decoding video data includes: means for determining whether motion information of a block of video data is for sub-blocks of the block larger than individual pixels of the block or for the individual pixels, the block being associated with data indicating that the block is to be predicted using affine motion compensation; means for performing sub-block-based affine motion compensation to form a prediction block for the block in response to determining that the motion information of the block is for the sub-blocks; means for performing pixel-based affine motion compensation to form the prediction block for the block in response to determining that the motion information is for the individual pixels; and means for decoding the block using the prediction block.

The details of one or more examples are set forth in the accompanying drawings and the description below. Other features, objects, and advantages will be apparent from the description, drawings, and claims.

DETAILED DESCRIPTION

In general, this disclosure is related to various techniques that may be used in conjunction with affine motion compensation for video coding. In particular, a block of video data may be predicted using sub-block-based affine motion compensation or pixel/sample-based affine motion compensation. Various other techniques may also be performed in conjunction with sub-block or pixel/sample based affine motion compensation, such as prediction refinement with optical flow (PROF), overlapped block motion compensation (OBMC), local illumination compensation (LIC), and/or multi-hypothesis prediction.

Certain combinations of these additional techniques in conjunction with affine motion compensation may be better than others, or lead to better or worse performance. Thus, this disclosure describes various constraints on when certain additional techniques are performed in conjunction with affine motion compensation and with each other. By restricting certain techniques from being used together and/or ensuring that other techniques are used together, the techniques of this disclosure may reduce the amount of testing needed to determine which techniques to enable or disable. Likewise, the techniques used in conjunction may reduce bitrate of an encoded video bitstream.

Figure 1:
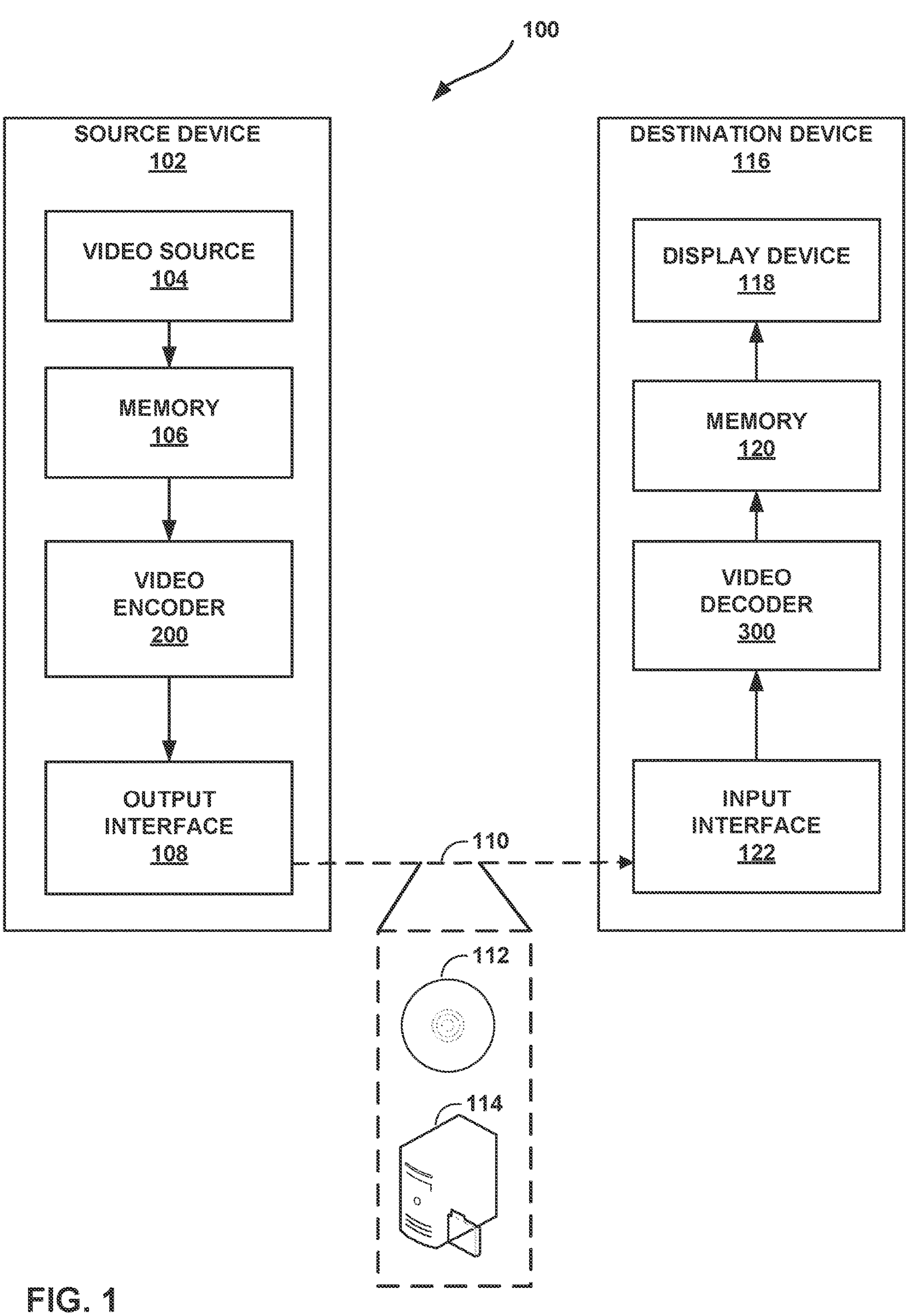
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using affine motion compensation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data using affine motion compensation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that code video data using affine motion compensation.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

According to the techniques of this disclosure, video encoder 200 may determine that a block of video data is to be predicted using affine motion compensation. For example, video encoder 200 may test various prediction and encoding schemes on the block (or a region of a frame) and determine that affine motion compensation yields the best performance among tested prediction modes for the block. Video encoder 200 may further determine whether affine motion compensation should be performed on a sub-block basis for the block, or on an individual pixel basis for the block. That is, video encoder 200 may form motion information for the block, and the motion information may either be for sub-blocks having sizes larger than individual pixels (i.e., larger than 1×1), or for the individual pixels.

In general, video encoder 200 may encode data representative of the motion information for the block. For example, video encoder 200 may encode data representing whether the block is to be predicted using two, three, or other numbers of motion vectors, e.g., as discussed in greater detail below with respect to FIGS. 2A and 2B. Video encoder 200 may further determine whether to perform sub-block based affine motion compensation or individual pixel based affine motion compensation. In the case of sub-block based affine motion compensation, video encoder 200 may calculate respective motion vectors for each sub-block of the block from the determined motion vectors as discussed in greater detail below. Furthermore, video encoder 200 may perform overlapped block motion compensation (OBMC) when sub-block based affine motion compensation is performed, and encode a value for an OBMC syntax element (e.g., an OBMC flag) for the block to indicate both that the motion information applies to sub-blocks of the block and that OBMC is to be performed for the block during decoding. In the case of individual pixel based affine motion compensation, video encoder 200 may avoid performing OBMC and encode a value for the OBMC syntax element to indicate both that the motion information applies to the individual pixels of the block and that OBMC is not to be performed for the block during decoding. Video encoder 200 may then generate the prediction block using affine motion compensation, with or without OBMC as discussed above.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may, for example, determine that a current block is to be predicted using affine motion compensation. According to the techniques of this disclosure, video decoder 300 may decode motion information for the current block from the bitstream. Video decoder 300 may further determine whether the motion information is for sub-blocks having sizes larger than individual pixels of the block, or for the individual pixels themselves. For example, video decoder 300 may determine a value for an OBMC syntax element (e.g., an OBMC flag). If the OBMC flag has a value indicating that OBMC is to be performed for the block, video decoder 300 may implicitly determine that the motion information is for the sub-blocks, whereas if the OBMC flag has a value indicating that OBMS is not to be performed for the block, video decoder 300 may implicitly determine that the motion information is for the individual pixels. Video decoder 300 may then perform affine motion compensation, with or without OBMC and for either the sub-blocks or for the individual pixels, as determined, to generate the prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
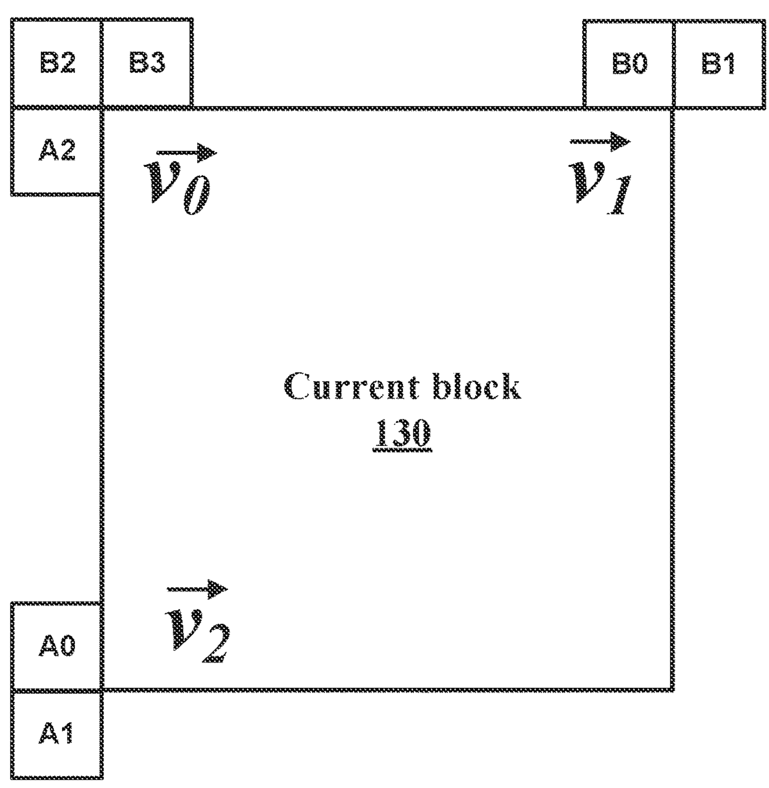
FIGS. 2A and 2B are conceptual diagrams illustrating examples of control point motion vectors (CPMVs) for affine motion compensation.
Figure 2B:
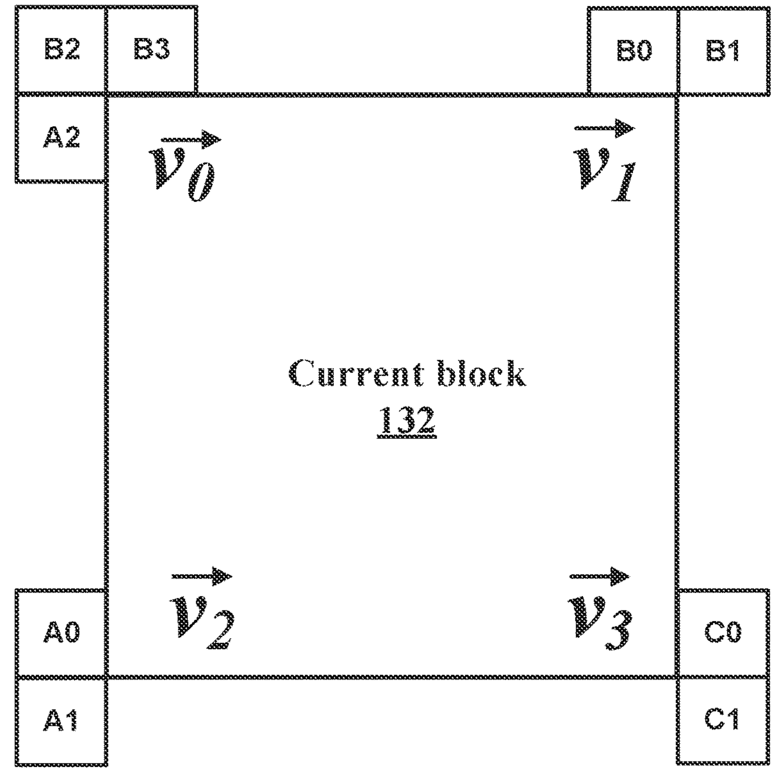

FIGS. 2A and 2B are conceptual diagrams illustrating examples of control point motion vectors (CPMVs) for affine motion compensation. In particular, FIG. 2A depicts current block 130 that is to be predicted using three CPMVs $V_0$, $V_1$, and $V_2$, while FIG. 2B depicts current block 132 that is to be predicted using four CPMVS $V_0$, $V_1$, $V_2$, and $V_3$.

An affine motion model can be described as:

$$\begin{cases} v_x = ax + by + e \\ v_y = cx + dy + f \end{cases} \quad (1)$$

where $(v_x, v_y)$ is the motion vector at the coordinate (x,y), and a, b, c, d, e, and f are the six parameters. This affine motion model is referred to as a 6-parameter affine motion model. In a typical video coder, a picture is partitioned into blocks for block-based coding. The affine motion model for a block can also be described by the 3 motion vectors (MVs) $\vec{v}_0=(v_{0x}, v_{0y})$, $\vec{v}_1=(v_{2x}, v_{2y})$, and $\vec{v}_2=(v_{2x}, v_{2y})$ at 3 different locations that are not in the same line. The 3 locations are usually referred to as control-points, the 3 motion vectors are referred to as control-point motion vectors (CPMVs).

In the case when the 3 control-points are at the 3 corners of the block as shown in FIG. 2A, the affine motion can be described as:

$$\begin{cases} v_x = \frac{(v_{1x} - v_{0x})}{blkW} x + \frac{(v_{2x} - v_{0x})}{blkH} y + v_{0x} \\ v_y = \frac{(v_{1y} - v_{0y})}{blkW} x + \frac{(v_{2y} - v_{0y})}{blkH} y + v_{0y} \end{cases} \quad (2)$$

where blkW and blkH represent the width and height of the block, respectively.

A simplified 4-parameters affine model (for zoom and rotational motion) may be described as:

$$\begin{cases} v_x = ax - by + e \\ v_y = bx + ay + f \end{cases} \quad (3)$$

Similarly, the simplified 4-parameters affine model for a block can be described by 2 CPMVs $\vec{v}_0=(v_{0x}, v_{0y})$ and $\vec{v}_1=(v_{1x}, v_{1y})$ at the 2 corners of the block. The motion field may then be described as:

$$\begin{cases} v_x = \frac{(v_{1x} - v_{0x})}{blkW} x - \frac{(v_{1y} - v_{0y})}{blkH} y + v_{0x} \\ v_y = \frac{(v_{1y} - v_{0y})}{blkW} x + \frac{(v_{1x} - v_{0x})}{blkH} y + v_{0y} \end{cases} \quad (4)$$

Given an affine motion model for a block, different motion vectors can be derived for each pixel in the block. Therefore, motion compensation can be performed in pixel-by-pixel. However, to reduce the complexity, sub-block based motion compensation may be used, in which the block is partitioned into multiple sub-blocks (that have smaller block size) and each sub-block is associate with one motion vector for motion compensation. That is, a block may have a single set of overhead data (which may, for example, indicate that the block is predicted using affine motion compensation), but each sub-block of the block may be individually predicted using respective motion information.

The motion vector(s) for each sub-block may be derived using the representative coordinates of the sub-block. For example, the center position may be used. In one example, the block is partitioned into non-overlapping sub-blocks. The block width is blkW, block height is blkH, the sub-block width is sbW and sub-block height is sbH, resulting in blkH/sbH rows of sub-blocks and blkW/sbW sub-blocks in each row. For a six parameter affine motion model, the motion vector for the sub-block (referred to as sub-block MV) at $i_{th}$ row (0<=i<blkW/sbW) and $j_{th}$ (0<=j<blkH/sbH) column may be derived as:

$$\begin{cases} v_x = \frac{(v_{1x} - v_{0x})}{blkW}\left(j * sbW + \frac{sbW}{2}\right) + \frac{(v_{2x} - v_{0x})}{blkH}\left(i * sbH + \frac{sbH}{2}\right) + v_{0x} \\ v_y = \frac{(v_{1y} - v_{0y})}{blkW}\left(j * sbW + \frac{sbW}{2}\right) + \frac{(v_{2y} - v_{0y})}{blkH}\left(i * sbH + \frac{sbH}{2}\right) + v_{0y} \end{cases} \quad (5)$$

After sub-block based affine motion compensation is performed, the prediction signal can be refined by adding an offset derived based on the pixel-wise motion and the gradient of the prediction signal, e.g., according to prediction refinement with optical flow (PROF). The offset at location (m,n) may be calculated as:

$$\Delta I(m,n)=g_x(m,n)*\Delta v_x(m,n)+g_y(m,n)*\Delta v_y(m,n)$$

wherein $g_x(m,n)$ is the horizontal gradient and $g_y(m,n)$ is the vertical gradient of the prediction signal, respectively. $\Delta v_x$ (m,n) and $\Delta v_y$ (m,n) are the differences in x and y components between the motion vector calculated at location pixel location (m,n) and the sub-block MV.

Let the coordinate of the top-left sample of the sub-block be (0,0), the center of the sub-block is $$\left(\frac{sbW}{2}, \frac{sbH}{2}\right).$$

Given the atone motion parameters a, b, c, and d, $\Delta v_x$ (m,n) and $\Delta v_y$ (m,n) can be derived as:

$$\Delta v_x(m, n) = a*\left(m - \frac{sbW}{2}\right) + b*\left(n - \frac{sbH}{2}\right)$$

$$\Delta v_y(m, n) = c*\left(m - \frac{sbW}{2}\right) + d*\left(n - \frac{sbH}{2}\right)$$

In the control-points based affine motion model, the affine motion parameters a, b, c, and d may be calculated from the CPMVs as:

$$a = \frac{(v_{1x} - v_{0x})}{blkW}$$

$$b = \frac{(v_{2x} - v_{0x})}{blkH}$$

$$c = \frac{(v_{1y} - v_{0y})}{blkW}$$

$$d = \frac{(v_{1y} - v_{0y})}{blkH}$$

When overlapped lock motion compensation (OBMC) is applied, top and left boundary pixels of a CU are refined using neighboring block's motion information with a weighted prediction as described in Lin et al., "CE10.2.1: OBMC," Joint Video Experts Team (JVET) of ITU-T SG 16 WP 3 and ISO/IEC JTC 1/SC 29/WG 11 12th Meeting: Macao, CN, document no. JVET-L0101, 3-12 Oct. 2018. According to JVET-L0101, OBMC is not applied when OBMC is disabled at the sequence parameter set (SPS) level, when a current block is predicted using intra mode or intra-block copy (IBC) mode, when the current block is predicted using local illumination compensation (LIC), or when the current luma block area is smaller than or equal to 32.

A sub-block-boundary OBMC is performed by applying the same blending to the top, left, bottom, and right sub-block boundary pixels using neighboring sub-block motion information. Sub-block-boundary OBMC is enabled for sub-blocks based coding tools such as affine AMVP modes, affine merge modes and sub-block-based temporal motion vector prediction (SbTMVP), and sub-block-based bilateral matching.

When OBMC mode is used in combined intra- and inter-prediction (CIIP) mode with luma mapping with chroma signaling (LMCS), inter blending may be performed prior to LMCS mapping of inter samples. LMCS may be applied to blended inter samples which are combined with LMCS applied intra samples in CIIP mode, as follows:

$$Inter'_{predY} = \frac{(128 - w_1) \times Inter_{predY} + w_1 \times OBMC_{predY}}{128}$$

-continued $$PredY = \frac{(4 - w_0) \times FwdMap(Inter'_{predY}) + w_0 \times Intra_{predY}}{4}$$

where $Inter_{predY}$ represents the samples predicted by the motion of current block in the original domain, $Intra_{predY}$ represents the samples predicted in the mapped domain, $OBMC_{predY}$ represents the samples predicted by the motion of neighboring blocks in the original domain, and $w_0$ and $w_1$ are the weights.

Local illumination compensation (LIC) is an inter prediction technique to model local illumination variation between current block and its prediction block as a function of that between current block template and reference block template. The parameters of the function can be denoted by a scale α and an offset β, which forms a linear equation, that is, α*p[x]+β to compensate illumination changes, where p[x] is a reference sample pointed to by MV at a location x on reference picture. Since α and β can be derived based on current block template and reference block template, no signaling overhead is required for them, except that an LIC flag is signaled for AMVP mode to indicate the use of LIC.

The local illumination compensation proposed in Seregin et al., "CE4-3.1a and CE4-3.1b: Unidirectional local illumination compensation with affine prediction," Joint Video Experts Team (JVET) of ITU-T SG 16 WP 3 and ISO/IEC JTC 1/SC 29/WG 11 15th Meeting: Gothenburg, SE, 3-12 Jul. 2019, document no. JVET-O0066, is used for uni-prediction inter CUs with the following modifications: intra neighbor samples can be used in LIC parameter derivation; LIC is disabled for blocks with less than 32 luma samples; and for both non-sub-block and affine modes, LIC parameter derivation is performed based on the template block samples corresponding to the current CU, instead of partial template block samples corresponding to first top-left 16×16 unit. Samples of the reference block template may be generated using motion compensation (MC) with the block motion vector (MV) without rounding the MV to integer-pixel (pel) precision.

In multi-hypothesis inter prediction (MHP) mode, as described in Winken et al., "CE10: Multi-hypothesis inter prediction (Test 10.1.2)," Joint Video Experts Team (JVET) of ITU-T SG 16 WP 3 and ISO/IEC JTC 1/SC 29/WG 11 13th Meeting: Marrakech, MA, 9-18 Jan. 2019, document no. JVET-M0425, one or more additional motion-compensated prediction signals are signaled, in addition to the conventional bi prediction signal. The resulting overall prediction signal is obtained by sample-wise weighted superposition. With the bi prediction signal $p_{bi}$ and the first additional inter prediction signal/hypothesis $h_3$, the resulting prediction signal $p_3$ is obtained as follows:

$$p_3=(1-\alpha)p_{bi}+\alpha h_3$$

The weighting factor α is specified by syntax element add_hyp_weight_idx, according to the following mapping:

| add_hyp_weight_idx | α |
|---|---|
| 0 | 1/4 |
| 1 | −1/8 |

Analogously to above, more than one additional prediction signal can be used. The resulting overall prediction signal is accumulated iteratively with each additional prediction signal, as follows:

$$p_{n+1}=(1-\alpha_{n+1})p_n+\alpha_{n+1}h_{n+1}$$

The resulting overall prediction signal is obtained as the last $p_n$ (i.e., the $p_n$ having the largest index n). Up to two additional prediction signals can be used (i.e., n is limited to 2).

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signaling modes.

For inter AMVP mode, per JVET-M0425, MHP is only applied if non-equal weight in BCW is selected in bi-prediction mode.

A combination of MHP and bi-directional optical flow (BDOF) is possible. However, BDOF is only applied to the bi-prediction signal part of the prediction signal (i.e., the ordinary first two hypotheses), per JVET-M0425.

Figure 3:
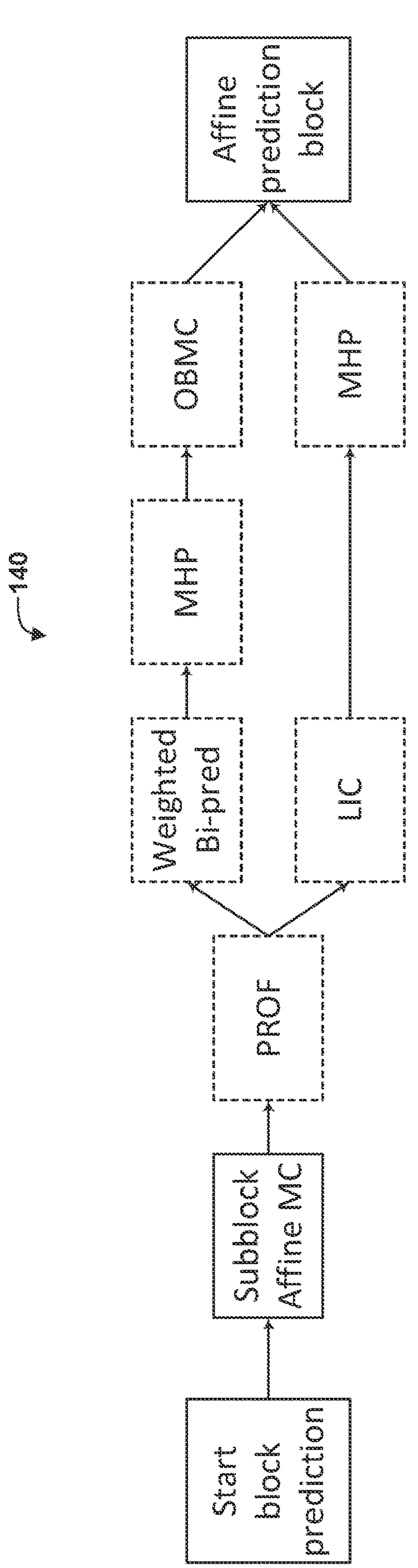
FIG. 3 is a conceptual diagram illustrating an example motion compensation process.

FIG. 3 is a conceptual diagram illustrating an example motion compensation process 140. An affine predicted block can be derived by applying one or several methods such as: pixel based affine MC, block based affine MC, PROF, LIC, weighted Bi-prediction, OBMC, and MHP. In one coding model, an affine prediction block can be derived as shown in FIG. 3, where dashed-line blocks are optionally applied.

Sub-block based affine MC has less prediction accuracy than pixel based affine MC, and sub-block based affine MC may encounter certain prediction problems on sub-block boundaries within a coding block. OBMC is a method that can compensate the prediction inconsistency on sub-block boundaries; however, some video coding processes treat OBMC as optional for application to a coding block. For example, when an affine coding block is to have LIC applied, OBMC may implicitly be determined to not be applied to the coding block.

Figure 4:
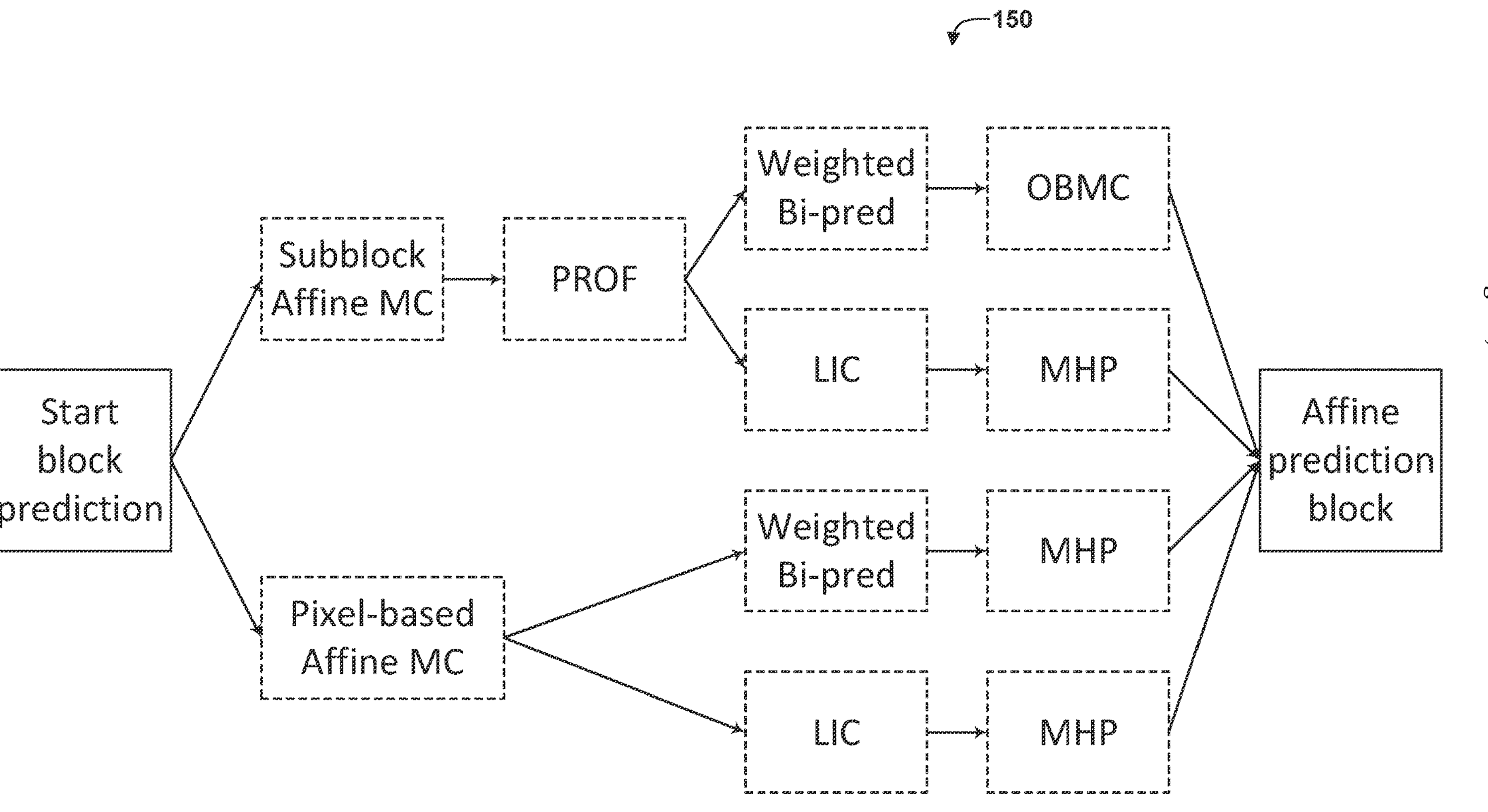
FIG. 4 is a conceptual diagram illustrating another example motion compensation process.

FIG. 4 is a conceptual diagram illustrating another example motion compensation process 150. This disclosure describes various techniques for deriving an affine predicted block. The disclosure includes several constraints on applying methods such as OBMC, MHP, and/or PROF to an affine predicted block. The techniques of this disclosure may be applied to both luma and chroma channels or only to the luma channel. Video encoder 200 and/or video decoder 300 may be configured to perform any of the various techniques discussed below, alone or in any combination.

As shown in FIG. 4, initially, a block to be affine motion compensation predicted is predicted using either sub-block based affine motion compensation or pixel-based affine motion compensation. In the example of FIG. 4, if the block is to be predicted using sub-block-based affine motion compensation, video encoder 200 or video decoder 300 may determine whether to apply PROF to the block. Video encoder 200 or video decoder 300 may then determine to apply either weighted bi-prediction followed by OBMC or LIC followed by MHP. On the other hand, per the example of FIG. 4, if the block is to be predicted using pixel-based affine motion compensation, video encoder 200 or video decoder 300 may determine to apply either weighted bi-prediction followed by MHP or LIC followed by MHP, without performing PROF.

In one example, an affine predicted block is derived by either applying sub-block based affine MC or pixel based affine MC, and pixel based affine MC is selected to be used when OBMC is determined to be not applied to the affine predicted block.

In one example, the smallest sub-block size of an affine block is predetermined to be 1×1. When a motion difference between two pixels is small enough, such that it does not make much difference for using the same motion vector for motion compensation, the two pixels may be grouped into a larger sub-block. That is, video encoder 200 may, for example, increase the sub-block size to M×N, where M is in range of 1 to block width, and N is in range of 1 to block height, inclusive.

In one example, when pixel based affine MC is applied, PROF is implicitly determined to be not applied.

In one example, when a smallest sub-block width is smaller than K, e.g., K is equal to 4, PROF is implicitly determined to not be applied.

In one example, when smallest sub-block height is smaller than K, e.g., K is equal to 4, PROF is implicitly determined to not be applied.

In one example, when an affine predicted block is decided to apply MHP, it is implicitly decided that OBMC is not to be applied.

In one example, an OBMC flag is signaled to be 0 or 1 when a block is decided to be affine coded block. Otherwise, OBMC flag value is implicitly determined, e.g., OBMC flag value is equal to 1.

In one example, OBMC flag is signaled to be 0 or 1 when a block is decided to be affine coded block and not be merge prediction mode. Otherwise, OBMC flag value is implicitly determined, e.g., OBMC flag value is implicitly determined to be equal to 1.

In one example, OBMC is decided to not apply to an affine coded block when the block has a width is equal or greater than MAX_WIDTH_OBMC_ON_AFFINE, e.g., 128, or a height is equal or greater than MAX_HEIGHT_OBMC_ON_AFFINE, e.g., 128.

In one example, pixel based affine MC is applied to derive prediction block when the POC distance between reference picture and current picture is greater than N, e.g., N is equal to 1.

In one example, the aforementioned technique(s) are applied to only non-low-delay pictures.

In one example, the OBMC flag is context coded, and different context is selected to use depending on the current picture is a low-delay picture or a non-low-delay picture.

In one example, the OBMC flag is context coded, and different context is selected to use depending on the current block is affine coded block or non-affine coded block.

In one example, an affine coded block can be predicted by applying both LIC and OBMC. When LIC is applied to an affine block, OBMC is not applied to the block boundary (top block boundary and left block boundary), but OBMC is applied to the sub-block boundaries.

Figure 5:
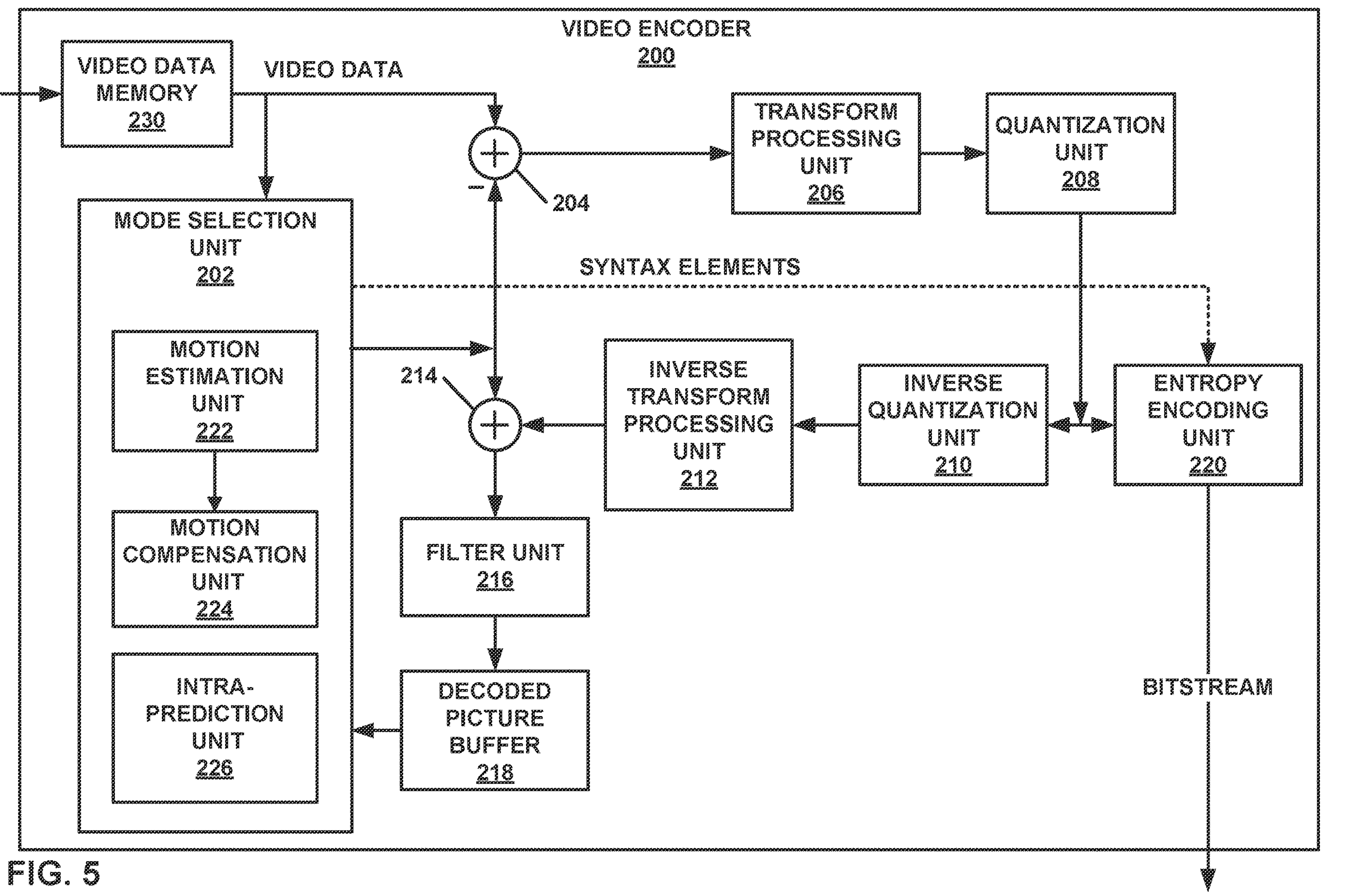
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. In some examples, motion compensation unit 224 may be configured to perform affine motion compensation according to any of the various techniques of this disclosure.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 6:
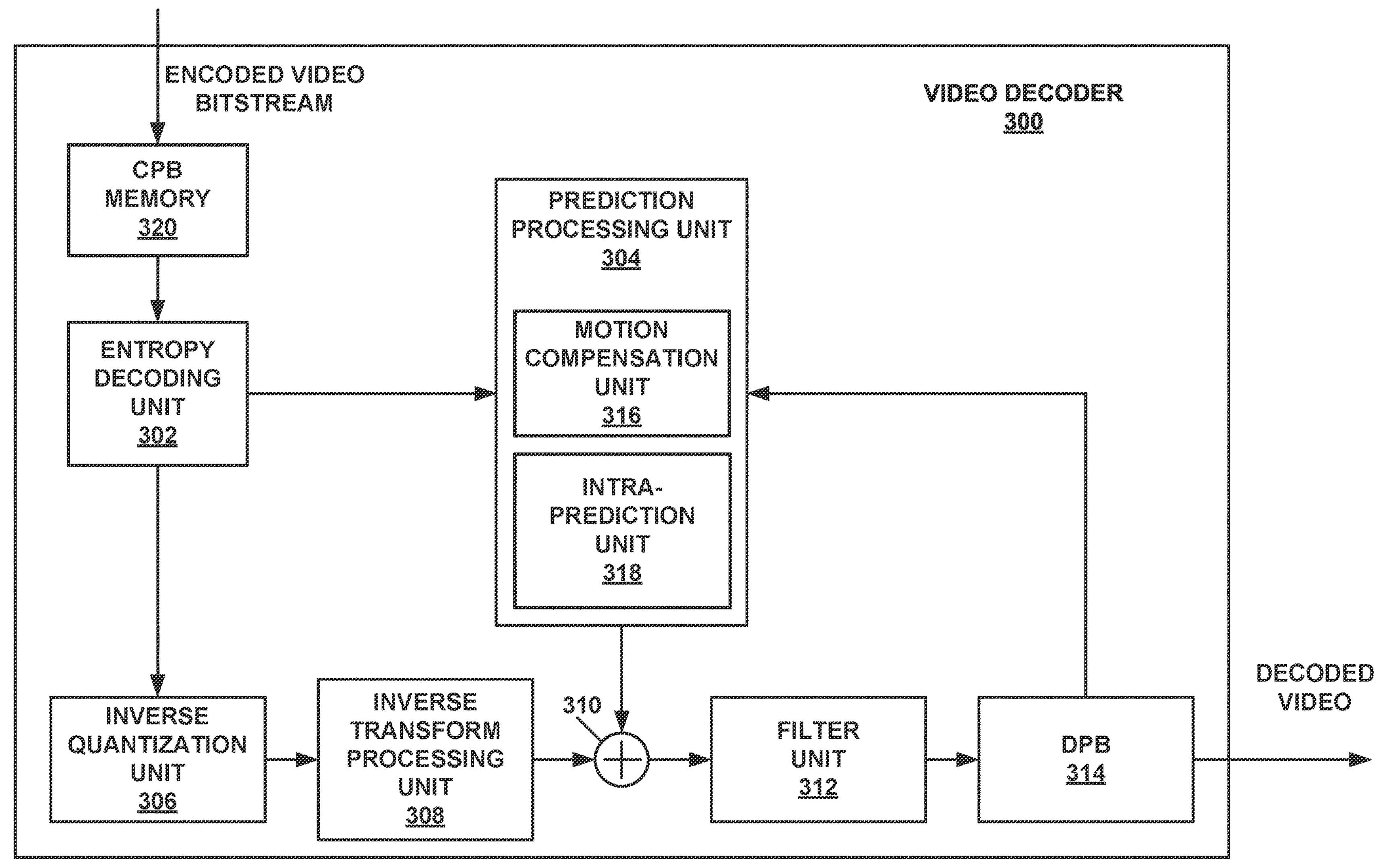
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. Motion compensation unit 316 may be configured to perform affine motion compensation according to any of the various techniques of this disclosure, alone or in any combination.

When operating according to AV1, compensation unit 316 may be configured to decode coding blocks of video data (e.g., both luma and chroma coding blocks) using translational motion compensation, affine motion compensation, OB MC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 7:
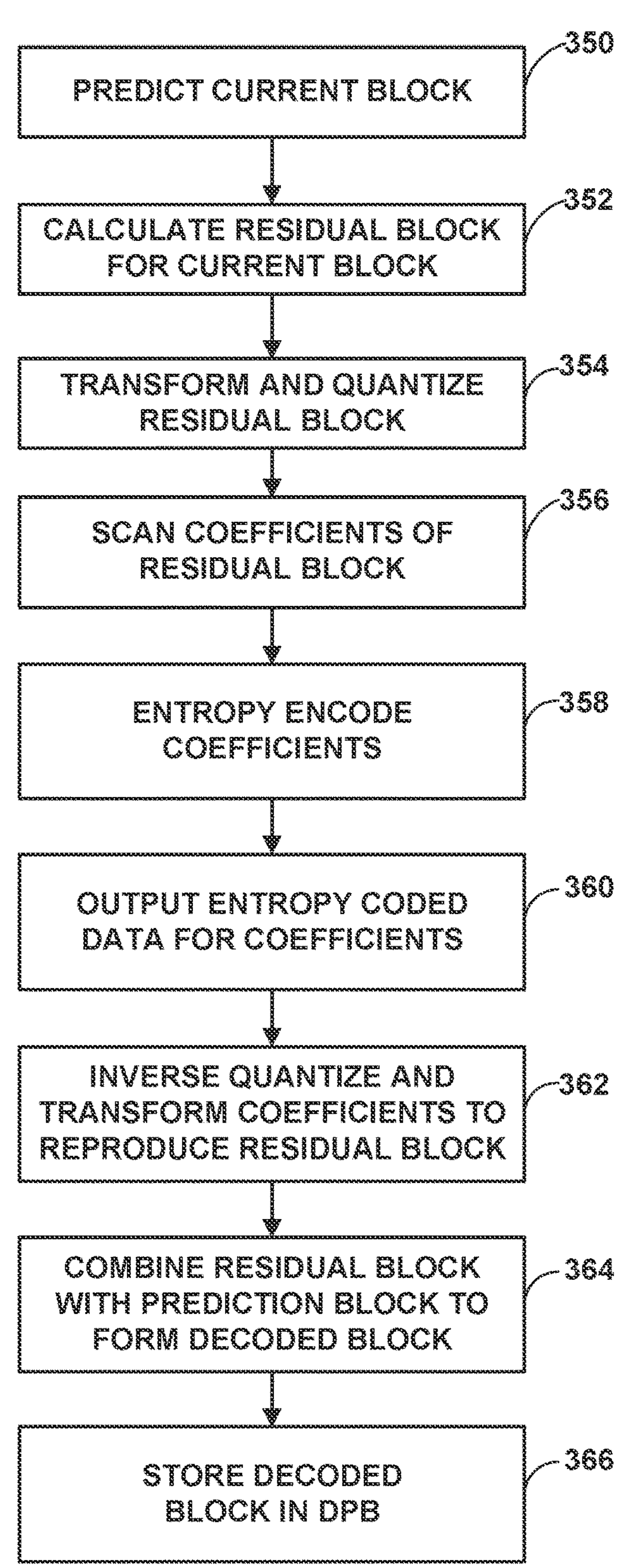
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block according to affine motion compensation using any of the various techniques of this disclosure, alone or in any combination. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 8:
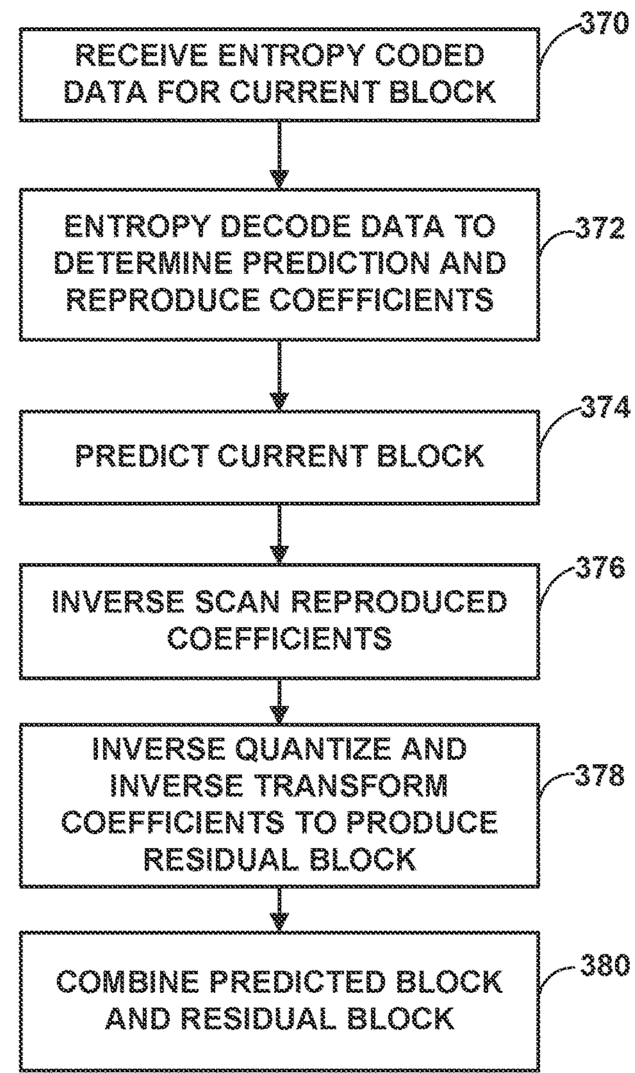
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., according to affine motion compensation using any of the various techniques of this disclosure, alone or in any combination, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
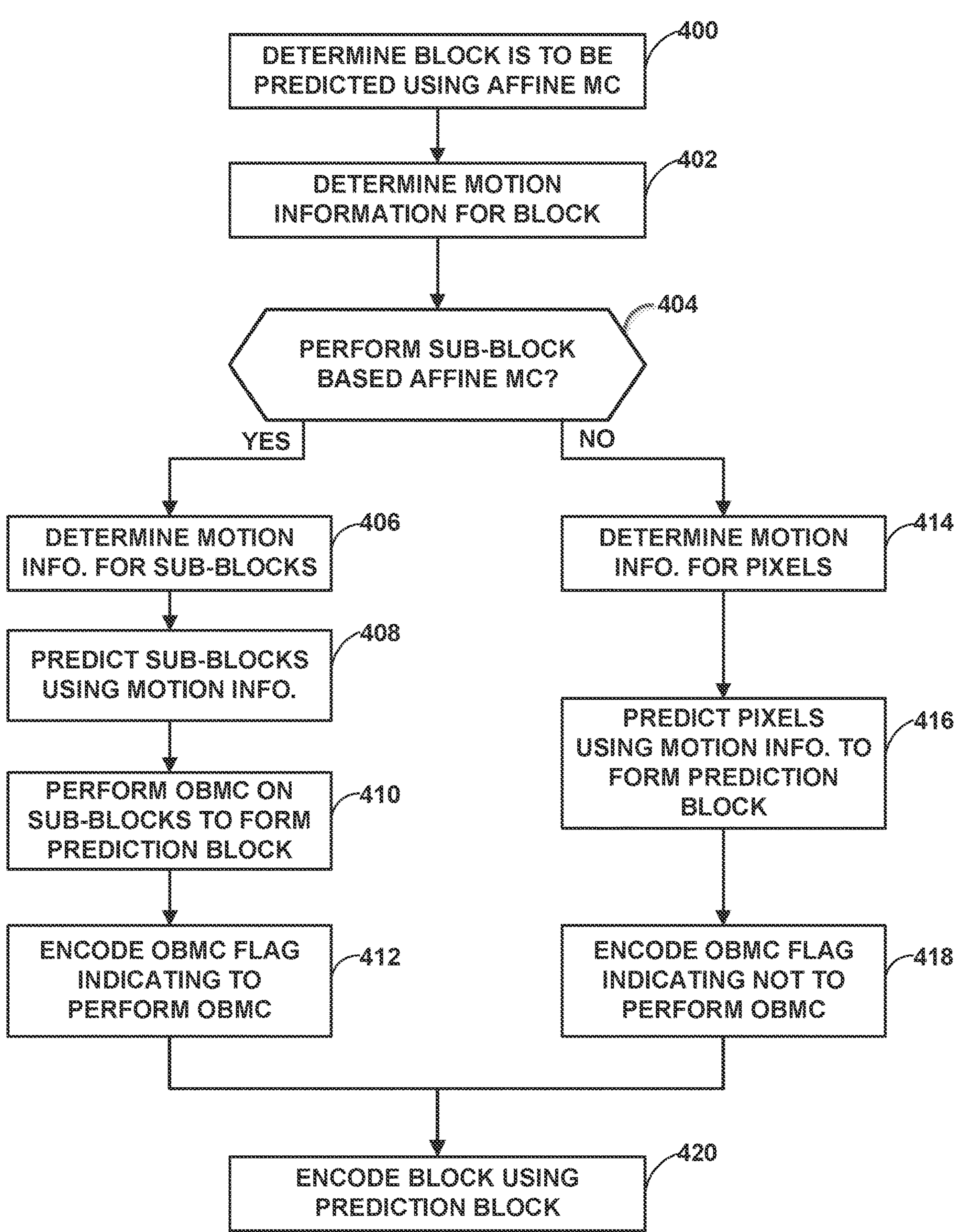
FIG. 9 is a flowchart illustrating an example method for encoding a current block using either sub-block based affine motion compensation or individual pixel based affine motion compensation according to the techniques of this disclosure.

FIG. 9 is a flowchart illustrating an example method for encoding a current block using either sub-block based affine motion compensation or individual pixel based affine motion compensation according to the techniques of this disclosure. The method of FIG. 9 is described with respect to video encoder 200 of FIGS. 1 and 5 for purposes of explanation. However, other video encoding devices may be configured to perform this or a similar method consistent with the techniques of this disclosure.

Initially, video encoder 200 determines that a block is to be predicted using affine motion compensation (MC) (400). For example, video encoder 200 may test a variety of prediction modes (e.g., inter-prediction modes, intra-prediction modes, and affine prediction mode) and determine that affine motion compensation yields a best rate-distortion optimization (RDO) value among the various tested modes. Video encoder 200 may then determine motion information for the block (402). For example, motion estimation unit 222 may determine motion vectors that, when applied in affine motion compensation, identify a reference block that best matches the block, e.g., using SAD, SSD, MAD, MSD, or other such difference metrics.

Video encoder 200 may also determine whether to perform sub-block based affine motion compensation (404). That is, video encoder 200 may determine whether to modify the motion vectors for sub-blocks having sizes larger than individual pixels or whether to modify the motion vectors for the individual pixels themselves. This determination may involve SAD, SSD, MAD, MSD, or other such difference metrics, as well as RDO determination and/or processing time determinations. In general, individual pixel based affine motion compensation may be more computationally expensive, and therefore, video encoder 200 may determine to use individual pixel based affine motion compensation when the performance (e.g., in terms of RDO or other such metrics) is greater than that of sub-block based affine motion compensation by some margin. In some examples, the margin may be determined according to a profile, tier, and/or level of a corresponding video coding standard. Otherwise, video encoder 200 may determine to use sub-block based affine motion compensation, e.g., when the performance of sub-block based affine motion compensation is comparable to that of sub-block based affine motion compensation or when the margin is not overcome.

In the case that video encoder 200 determines to perform sub-block based affine motion compensation ("YES" branch of 404), video encoder 200 may determine motion information for the sub-blocks (406). For example, as discussed above with respect to formula (5), video encoder 200 may modify the determined motion information for the block for each of the sub-blocks. Video encoder 200 may then predict each of the sub-blocks using the corresponding motion information (408). Video encoder 200 may further perform OBMC to form a prediction block for the block from the predicted sub-blocks (410). Moreover, video encoder 200 may encode a value for an OBMC flag indicating that OBMC is to be performed on the block (412).

On the other hand, in the case that video encoder 200 determines not to perform sub-block based affine motion compensation ("NO" branch of 404), video encoder 200 may determine motion information for the individual pixels (414). This process may be similar to that described with respect to formula (5), except that the pixels are treated as 1×1 sub-blocks, and thus, the center pixel would be the pixel itself. Accordingly, video encoder 200 may use the motion information to predict the individual pixels to form the prediction block (416). Because each pixel is predicted individually in this case, OBMC need not be performed. Thus, video encoder 200 encodes an OBMC flag indicating that OBMC is not to be performed for the block (418).

Ultimately, video encoder 200 may then encode the block using the prediction block (420). For example, as discussed with respect to FIG. 7, video encoder 200 may calculate pixel-by-pixel differences between the prediction block and the block to be encoded to form a residual block, then quantize and transform the residual block to form a block of quantized transform coefficients, then entropy encode each quantized transform coefficient.

In this manner, the method of FIG. 9 represents an example of a method of encoding a block of video data including determining whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, performing sub-block-based affine motion compensation to form a prediction block for the block; in response to determining that the motion information is for the individual pixels, performing pixel-based affine motion compensation to form the prediction block for the block; and encoding the block using the prediction block.

Figure 10:
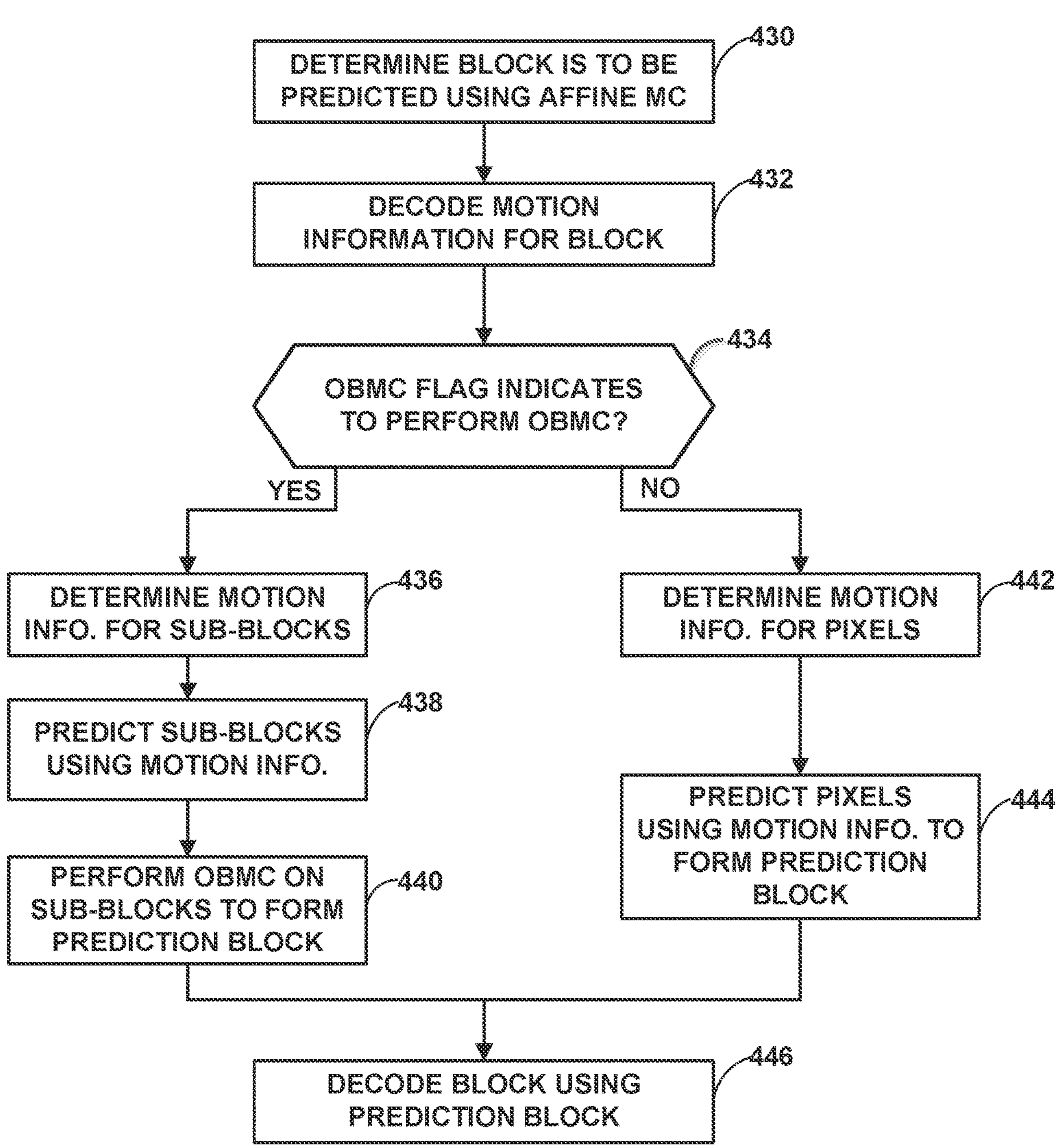
FIG. 10 is a flowchart illustrating an example method for decoding a current block using either sub-block based affine motion compensation or individual pixel based affine motion compensation according to the techniques of this disclosure.

FIG. 10 is a flowchart illustrating an example method for decoding a current block using either sub-block based affine motion compensation or individual pixel based affine motion compensation according to the techniques of this disclosure. The method of FIG. 10 is described with respect to video decoder 300 of FIGS. 1 and 6 for purposes of explanation. However, other video encoding devices may be configured to perform this or a similar method consistent with the techniques of this disclosure.

Initially, video decoder 300 may determine that a block is to be predicted using affine motion compensation (MC) (430). For example, video decoder 300 may decode data in the bitstream indicating that the block is to be predicted using affine motion compensation. Video decoder 300 may further decode motion information for the block (432). For example, video decoder 300 may decode data indicating a number of motion vectors to be used in affine mode, and for each of the motion vectors, e.g., a merge index indicating a position of a candidate motion vector to be used, an AMVP index along with motion vector difference information, or the like.

Video decoder 300 may also decode an OBMC flag for the block. Video decoder 300 may determine whether the value of the OBMC flag indicates that OBMC is to be performed (434). In the case that the OBMC flag indicates that OBMC is to be performed ("YES" branch of 434), video decoder 300 may determine motion information for sub-blocks of the block, where the sub-blocks are larger than individual pixels of the block (436). For example, video decoder 300 may modify the decoded motion information to fit each sub-block, e.g., as discussed above with respect to formula (5). Video decoder 300 may then predict each of the sub-blocks using the respective motion information (438) and perform OBMC on the sub-blocks to form the prediction block (440).

Alternatively, if the OBMC flag indicates that OBMC is not to be performed ("NO" branch of 434), video decoder 300 may determine motion information for each of the individual pixels of block (442). Video decoder 300 may then predict the pixels using the respective motion information to form the prediction block (444). Video decoder 300 may avoid performing OBMC in this case, since the individual pixels would not overlap with each other. As such, video decoder 300 may use the OBMC flag as an indication of whether motion information for the block to be predicted using affine motion compensation applies to sub-blocks larger than individual pixels or to the individual pixels themselves.

Ultimately, video decoder 300 may decode the block using the prediction block (446). For example, video decoder 300 may entropy decode quantized transform coefficients, inverse quantize and inverse transform the quantized transform coefficients, and reconstruct a residual block for the block. Video decoder 300 may then combine the pixels of the residual block with the pixels of the prediction block on a pixel-by-pixel basis to reconstruct the current block.

In this manner, the method of FIG. 10 represents an example of a method of decoding video data including determining whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, performing sub-block-based affine motion compensation to form a prediction block for the block; in response to determining that the motion information is for the individual pixels, performing pixel-based affine motion compensation to form the prediction block for the block; and decoding the block using the prediction block.

Various examples of the techniques of this disclosure are summarized in the following clauses:

Clause 1: A method of decoding video data, the method comprising: determining whether overlapped block motion compensation (OBMC) is to be applied to a block of video data, the block of video data being associated with data indicating that the block of video data is to be predicted using affine motion compensation; in response to determining that OBMC is to be applied to the block of video data, performing sub-block-based affine motion compensation to form a prediction block for the block of video data; in response to determining that OBMC is not to be applied to the block of video data, performing pixel-based affine motion compensation to form the prediction block for the block of video data; and decoding the block of video data using the prediction block.

Clause 2: A method of decoding video data, the method comprising: determining that a block of video data is to be predicted using pixel-based affine motion compensation; in response to determining that the block of video data is to be predicted using pixel-based affine motion compensation, determining that prediction refinement with optical flow (PROF) is not to be performed on the block of video data; forming a prediction block for the block of video data using pixel-based affine motion compensation and without performing PROF; and decoding the block of video data using the prediction block.

Clause 3: A method comprising a combination of the method of clause 1 and the method of clause 2.

Clause 4: The method of any of clauses 2 and 3, wherein determining that PROF is not to be performed comprises determining that PROF is not to be performed without coding syntax elements related to PROF for the block of video data.

Clause 5: A method of decoding video data, the method comprising: partitioning a block of video data into a plurality of sub-blocks, the block of video data being associated with data indicating that the block of video data is to be predicted using affine motion compensation; when a smallest sub-block of the sub-blocks has a size less than a threshold, determining that prediction refinement with optical flow (PROF) is not to be performed on the block of video data; forming a prediction block for the block of video data using affine motion compensation; and decoding the block of video data using the prediction block.

Clause 6: A method comprising a combination of the method of any of clauses 1-4 and the method of clause 5.

Clause 7: The method of any of clauses 5 and 6, wherein the size of the smallest sub-block corresponds to one dimension of the sub-block, and wherein the threshold is 4 samples.

Clause 8: The method of clause 7, wherein the one dimension comprises one of a height of the smallest sub-block or a width of the smallest sub-block.

Clause 9: The method of any of clauses 5-8, wherein determining that PROF is not to be performed comprises determining that PROF is not to be performed without coding syntax elements related to PROF for the block of video data.

Clause 10: A method of decoding video data, the method comprising: determining that a block of video data is to be predicted using affine motion compensation; in response to determining that a prediction block is to be formed for the block of video data using multi-hypothesis prediction (MHP), determining not to apply overlapped block motion compensation (OBMC) when forming the prediction block; forming the prediction block for the block of video data; and decoding the block of video data using the prediction block.

Clause 11: A method comprising a combination of the method of any of clauses 1-9 and the method of clause 10.

Clause 12: The method of any of clauses 10 and 11, wherein determining that OBMC is not to be performed comprises determining that OBMC is not to be performed without coding syntax elements related to OBMC for the block of video data.

Clause 13: A method of decoding video data, the method comprising: determining that a block of video data is to be predicted using affine motion compensation; coding data indicating whether overlapped block motion compensation (OBMC) is to be applied to the block of video data; forming a prediction block for the block of video data; and decoding the block of video data using the prediction block.

Clause 14: A method comprising a combination of the method of any of clauses 1-9 and the method of clause 13.

Clause 15: The method of any of clauses 13 and 14, further comprising: determining that a second block of video data is not to be predicted using affine motion compensation; in response to determining that the second block of video data is not to be predicted using affine motion compensation, implicitly determining whether to apply OBMC to the second block of video data without coding data indicating whether to apply OBMC to the second block of video data; forming a second prediction block for the second block of video data; and decoding the second block of video data using the second prediction block.

Clause 16: The method of any of clauses 13-15, further comprising determining that the block of video data is to be predicted using an affine motion compensation mode other than merge prediction mode.

Clause 17: The method of any of clauses 13-16, wherein coding the data indicating whether OBMC is to be applied comprises: determining a context for context coding the data indicating whether OBMC is to be applied according to whether a picture including the block of video data is a low-delay picture or a non-low-delay picture; and context coding the data indicating whether OBMC is to be applied using the determined context.

Clause 18: The method of any of clauses 13-16, wherein coding the data indicating whether OBMC is to be applied comprises: determining a context for context coding the data indicating whether OBMC is to be applied according to the block of video data being predicted using affine motion compensation; and context coding the data indicating whether OBMC is to be applied using the determined context.

Clause 19: A method of decoding video data, the method comprising: determining that a block of video data is to be predicted using affine motion compensation; determining whether the block of video data has a size greater than a threshold; when the block of vide data has the size greater than the threshold, determining not to apply overlapped block motion compensation (OBMC) to the block of video data; forming a prediction block for the block of video data; and decoding the block of video data using the prediction block.

Clause 20: A method comprising a combination of the method of any of clauses 1-9 and the method of clause 19.

Clause 21: The method of any of clauses 19 and 20, wherein the size of the block of video data corresponds to one dimension of the block of video data, and wherein the threshold comprises 128 samples.

Clause 22: The method of clause 21, wherein the one dimension comprises one of a width of the block of video data or a height of the block of video data.

Clause 23: A method of decoding video data, the method comprising: determining that a block of a current picture of video data is to be predicted relative to a reference picture of the video data using affine motion compensation; determining a difference between a picture order count (POC) for the current picture and a POC for the reference picture; when the difference between the POC for the current picture and the POC for the reference picture is greater than a threshold, forming a prediction block for the block of the current picture of video data using pixel based affine motion compensation; and decoding the block of video data using the prediction block.

Clause 24: A method comprising a combination of the method of any of clauses 1-22 and the method of clause 23.

Clause 25: The method of any of clauses 23 and 24, wherein the threshold is a value of 1.

Clause 26: A method of decoding video data, the method comprising: determining that a block of video data is to be predicted using affine motion compensation; forming a prediction block for the block of video data using both local illumination compensation (LIC) and overlapped block motion compensation (OBMC); and decoding the block of video data using the prediction block.

Clause 27: A method comprising a combination of the method of any of clauses 1-9, 13-18, and 23-26.

Clause 28: The method of any of clauses 26 and 27, wherein forming the prediction block comprises performing OBMC on sub-block boundaries within the block of video data without performing OBMC on boundaries of the block of video data.

Clause 29: The method of clause 28, wherein the boundaries of the block of video data comprise an upper boundary of the block of video data and a left boundary of the block of video data.

Clause 30: The method of any of clauses 1-29, wherein the block of video data is included in a non-low-delay picture.

Clause 31: The method of any of clauses 1-30, further comprising encoding the current block prior to decoding the current block.

Clause 32: A device for decoding video data, the device comprising one or more means for performing the method of any of clauses 1-31.

Clause 33: The device of clause 32, wherein the one or more means comprise one or more processors implemented in circuitry.

Clause 34: The device of any of clauses 32 and 33, further comprising a display configured to display the decoded video data.

Clause 35: The device of any of clauses 32-34, wherein the device comprises one or more of a camera, a computer, a mobile device, a broadcast receiver device, or a set-top box.

Clause 36: The device of clause 32-35, further comprising a memory configured to store the video data.

Clause 37: A computer-readable storage medium having stored thereon instructions that, when executed, cause a processor of a device for decoding video data to perform the method of any of clauses 1-31.

Clause 38: A method of decoding video data, the method comprising: determining whether overlapped block motion compensation (OBMC) is to be applied to a block of video data, the block of video data being associated with data indicating that the block of video data is to be predicted using affine motion compensation; in response to determining that OBMC is to be applied to the block of video data, performing sub-block-based affine motion compensation to form a prediction block for the block of video data; in response to determining that OBMC is not to be applied to the block of video data, performing pixel-based affine motion compensation to form the prediction block for the block of video data; and decoding the block of video data using the prediction block.

Clause 39: A method of decoding video data, the method comprising: determining that a block of video data is to be predicted using pixel-based affine motion compensation; in response to determining that the block of video data is to be predicted using pixel-based affine motion compensation, determining that prediction refinement with optical flow (PROF) is not to be performed on the block of video data; forming a prediction block for the block of video data using pixel-based affine motion compensation and without performing PROF; and decoding the block of video data using the prediction block.

Clause 40: The method of clause 39, wherein determining that PROF is not to be performed comprises determining that PROF is not to be performed without coding syntax elements related to PROF for the block of video data.

Clause 41: A method of decoding video data, the method comprising: partitioning a block of video data into a plurality of sub-blocks, the block of video data being associated with data indicating that the block of video data is to be predicted using affine motion compensation; when a smallest sub-block of the sub-blocks has a size less than a threshold, determining that prediction refinement with optical flow (PROF) is not to be performed on the block of video data; forming a prediction block for the block of video data using affine motion compensation; and decoding the block of video data using the prediction block.

Clause 42: The method of clause 41, wherein the size of the smallest sub-block corresponds to one dimension of the sub-block, and wherein the threshold is 4 samples.

Clause 43: The method of clause 42, wherein the one dimension comprises one of a height of the smallest sub-block or a width of the smallest sub-block.

Clause 44: The method of clause 41, wherein determining that PROF is not to be performed comprises determining that PROF is not to be performed without coding syntax elements related to PROF for the block of video data.

Clause 45: A method of decoding video data, the method comprising: determining that a block of video data is to be predicted using affine motion compensation; in response to determining that a prediction block is to be formed for the block of video data using multi-hypothesis prediction (MHP), determining not to apply overlapped block motion compensation (OBMC) when forming the prediction block; forming the prediction block for the block of video data; and decoding the block of video data using the prediction block.

Clause 46: The method of clause 45, wherein determining that OBMC is not to be performed comprises determining that OBMC is not to be performed without coding syntax elements related to OBMC for the block of video data.

Clause 47: A method of decoding video data, the method comprising: determining that a block of video data is to be predicted using affine motion compensation; coding data indicating whether overlapped block motion compensation (OBMC) is to be applied to the block of video data; forming a prediction block for the block of video data; and decoding the block of video data using the prediction block.

Clause 48: The method of clause 47, further comprising: determining that a second block of video data is not to be predicted using affine motion compensation; in response to determining that the second block of video data is not to be predicted using affine motion compensation, implicitly determining whether to apply OBMC to the second block of video data without coding data indicating whether to apply OBMC to the second block of video data; forming a second prediction block for the second block of video data; and decoding the second block of video data using the second prediction block.

Clause 49: The method of clause 47, further comprising determining that the block of video data is to be predicted using an affine motion compensation mode other than merge prediction mode.

Clause 50: The method of clause 47, wherein coding the data indicating whether OBMC is to be applied comprises:

determining a context for context coding the data indicating whether OBMC is to be applied according to whether a picture including the block of video data is a low-delay picture or a non-low-delay picture; and context coding the data indicating whether OBMC is to be applied using the determined context.

Clause 51: The method of clause 47, wherein coding the data indicating whether OBMC is to be applied comprises: determining a context for context coding the data indicating whether OBMC is to be applied according to the block of video data being predicted using affine motion compensation; and context coding the data indicating whether OBMC is to be applied using the determined context.

Clause 52: A method of decoding video data, the method comprising: determining that a block of video data is to be predicted using affine motion compensation; determining whether the block of video data has a size greater than a threshold; when the block of vide data has the size greater than the threshold, determining not to apply overlapped block motion compensation (OBMC) to the block of video data; forming a prediction block for the block of video data; and decoding the block of video data using the prediction block.

Clause 53: The method of clause 52, wherein the size of the block of video data corresponds to one dimension of the block of video data, and wherein the threshold comprises 128 samples.

Clause 54: The method of clause 53, wherein the one dimension comprises one of a width of the block of video data or a height of the block of video data.

Clause 55: A method of decoding video data, the method comprising: determining that a block of a current picture of video data is to be predicted relative to a reference picture of the video data using affine motion compensation; determining a difference between a picture order count (POC) for the current picture and a POC for the reference picture; when the difference between the POC for the current picture and the POC for the reference picture is greater than a threshold, forming a prediction block for the block of the current picture of video data using pixel based affine motion compensation; and decoding the block of video data using the prediction block.

Clause 56: The method of clause 55, wherein the threshold is a value of 1.

Clause 57: A method of decoding video data, the method comprising: determining that a block of video data is to be predicted using affine motion compensation; forming a prediction block for the block of video data using both local illumination compensation (LIC) and overlapped block motion compensation (OBMC); and decoding the block of video data using the prediction block.

Clause 58: The method of clause 57, wherein forming the prediction block comprises performing OBMC on sub-block boundaries within the block of video data without performing OBMC on boundaries of the block of video data.

Clause 59: The method of clause 58, wherein the boundaries of the block of video data comprise an upper boundary of the block of video data and a left boundary of the block of video data.

Clause 60: A device for decoding video data, the device comprising: means for determining whether overlapped block motion compensation (OBMC) is to be applied to a block of video data, the block of video data being associated with data indicating that the block of video data is to be predicted using affine motion compensation; means for performing sub-block-based affine motion compensation to form a prediction block for the block of video data in response to determining that OBMC is to be applied to the block of video data; means for performing pixel-based affine motion compensation to form the prediction block for the block of video data in response to determining that OBMC is not to be applied to the block of video data; and means for decoding the block of video data using the prediction block.

Clause 61: A device for decoding video data, the device comprising: means for determining that a block of video data is to be predicted using pixel-based affine motion compensation; means for determining that prediction refinement with optical flow (PROF) is not to be performed on the block of video data in response to determining that the block of video data is to be predicted using pixel-based affine motion compensation; means for forming a prediction block for the block of video data using pixel-based affine motion compensation and without performing PROF; and means for decoding the block of video data using the prediction block.

Clause 62: A device for decoding video data, the device comprising: means for partitioning a block of video data into a plurality of sub-blocks, the block of video data being associated with data indicating that the block of video data is to be predicted using affine motion compensation; means for determining that prediction refinement with optical flow (PROF) is not to be performed on the block of video data when a smallest sub-block of the sub-blocks has a size less than a threshold; means for forming a prediction block for the block of video data using affine motion compensation; and means for decoding the block of video data using the prediction block.

Clause 63: A device for decoding video data, the device comprising: means for determining that a block of video data is to be predicted using affine motion compensation; means for determining not to apply overlapped block motion compensation (OBMC) when forming the prediction block in response to determining that a prediction block is to be formed for the block of video data using multi-hypothesis prediction (MHP); means for forming the prediction block for the block of video data; and means for decoding the block of video data using the prediction block.

Clause 64: A device for decoding video data, the device comprising: means for determining that a block of video data is to be predicted using affine motion compensation; means for coding data indicating whether overlapped block motion compensation (OBMC) is to be applied to the block of video data; means for forming a prediction block for the block of video data; and means for decoding the block of video data using the prediction block.

Clause 65: A device for decoding video data, the device comprising: means for determining that a block of video data is to be predicted using affine motion compensation; means for determining whether the block of video data has a size greater than a threshold; means for determining not to apply overlapped block motion compensation (OBMC) to the block of video data when the block of vide data has the size greater than the threshold; means for forming a prediction block for the block of video data; and means for decoding the block of video data using the prediction block.

Clause 66: A device for decoding video data, the device comprising: means for determining that a block of a current picture of video data is to be predicted relative to a reference picture of the video data using affine motion compensation; means for determining a difference between a picture order count (POC) for the current picture and a POC for the reference picture; means for forming a prediction block for the block of the current picture of video data using pixel based affine motion compensation when the difference between the POC for the current picture and the POC for the reference picture is greater than a threshold; and means for decoding the block of video data using the prediction block.

Clause 67: A device for decoding video data, the device comprising: means for determining that a block of video data is to be predicted using affine motion compensation; means for forming a prediction block for the block of video data using both local illumination compensation (LIC) and overlapped block motion compensation (OBMC); and means for decoding the block of video data using the prediction block.

Clause 68: A method of encoding video data, the method comprising: determining that a motion difference between a first portion of a block of video data and a second portion of the block of video data is smaller than a threshold; grouping the first portion and the second portion into a single portion; forming prediction information for the single portion as a corresponding portion of a prediction block; and encoding the block of video data using the prediction block.

Clause 69: The method of clause 68, further comprising encoding data indicating that the first portion and the second portion are to be grouped into the single portion.

Clause 70: The method of any of clauses 68 and 69, wherein the first portion is a first sample and the second portion is a second sample neighboring the first sample.

Clause 71: A method of decoding video data, the method comprising: determining whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, performing sub-block-based affine motion compensation to form a prediction block for the block; in response to determining that the motion information is for the individual pixels, performing pixel-based affine motion compensation to form the prediction block for the block; and decoding the block using the prediction block.

Clause 72: The method of clause 71, wherein determining whether the motion information is for the sub-blocks or for the individual pixels comprises determining whether overlapped block motion compensation (OBMC) is to be applied to the block.

Clause 73: The method of clause 72, further comprising, when OBMC is to be applied, performing OBMC on internal sub-block boundaries of the sub-blocks and performing local illumination compensation (LIC) to form the prediction block, without performing OBMC on outer boundaries of the block.

Clause 74: The method of clause 72, wherein determining whether OBMC is to be applied to the block comprises, when multi-hypothesis prediction (MHP) is determined to be applied to the block, determining that OBMC is not to be applied to the block without decoding syntax elements related to OBMC for the block.

Clause 75: The method of clause 72, wherein determining whether OBMC is to be applied to the block comprises determining a value of an OBMC syntax element, the value of the OBMC syntax element representing whether OBMC is to be applied to the block.

Clause 76: The method of clause 75, wherein the OBMC syntax element comprises an OBMC flag.

Clause 77: The method of clause 75, further comprising: determining a context for decoding the OBMC syntax element according to whether a picture including the block of video data is a low-delay picture or a non-low-delay picture; and context-based decoding the OBMC syntax element using the determined context.

Clause 78: The method of clause 75, further comprising: determining a context for decoding the OBMC syntax element according to the data indicating that the block is to be predicted using affine motion compensation; and context-based decoding the OBMC syntax element using the determined context.

Clause 79: The method of clause 72, wherein determining whether OBMC is to be applied to the block comprises, when the block of has a size greater than a threshold, determining not to apply OBMC to the block of video data.

Clause 80: The method of clause 79, wherein the size of the block of video data corresponds to one dimension of the block of video data, and wherein the threshold comprises 128 samples along the one dimension.

Clause 81: The method of clause 80, wherein the one dimension comprises one of a width of the block of video data or a height of the block of video data.

Clause 82: The method of clause 71, wherein the block comprises a luminance block, the method further comprising performing pixel-based affine motion compensation for a chrominance block corresponding to the luminance block.

Clause 83: The method of clause 71, further comprising, in response to determining that the motion information of the block is for the individual pixels, determining that prediction refinement with optical flow (PROF) is not to be performed on the block.

Clause 84: The method of clause 83, wherein determining that PROF is not to be performed comprises determining that PROF is not to be performed without decoding syntax elements related to PROF for the block.

Clause 85: The method of clause 71, further comprising, in response to determining that the motion information of the block is for the sub-blocks, when a smallest sub-block of the sub-blocks has a size less than a threshold, determining that prediction refinement with optical flow (PROF) is not to be performed on the block.

Clause 86: The method of clause 85, wherein the size of the smallest sub-block corresponds to one dimension of the sub-block, and wherein the threshold is 4 samples.

Clause 87: The method of clause 86, wherein the one dimension comprises one of a height of the smallest sub-block or a width of the smallest sub-block.

Clause 88: The method of clause 85, wherein determining that PROF is not to be performed comprises determining that PROF is not to be performed without decoding syntax elements related to PROF for the block.

Clause 89: The method of clause 71, wherein the block comprises a first block and the prediction block comprises a first prediction block, the method further comprising: determining that a second block of the video data is not to be predicted using affine motion compensation; in response to determining that the second block of video data is not to be predicted using affine motion compensation, implicitly determining whether to apply overlapped block motion compensation (OBMC) to the second block of video data without decoding data indicating whether to apply OBMC to the second block of video data; forming a second prediction block for the second block of video data; and decoding the second block of video data using the second prediction block.

Clause 90: The method of clause 71, wherein the data indicating that the block is to be predicted using affine motion compensation includes data indicating that the block of video data is to be predicted using an affine motion compensation mode other than merge prediction mode.

Clause 91: The method of clause 71, wherein a current picture includes the block and the motion information refers to a reference picture, and wherein determining whether the motion information is for the sub-blocks or the individual pixels comprises: determining a difference between a picture order count (POC) for the current picture and a POC for the reference picture; and when the difference between the POC for the current picture and the POC for the reference picture is greater than a threshold, determining that the motion information is for the individual pixels.

Clause 92: The method of clause 91, wherein the threshold is a value of 1.

Clause 93: The method of clause 71, wherein the block is included in a non-low-delay picture.

Clause 94: The method of clause 71, further comprising encoding the current block prior to decoding the current block.

Clause 95: A device for decoding video data, the device comprising: a memory configured to store video data; and a processing system comprising one or more processors implemented in circuitry, the processing system being configured to: determine whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, perform sub-block-based affine motion compensation to form a prediction block for the block; in response to determining that the motion information is for the individual pixels, perform pixel-based affine motion compensation to form the prediction block for the block; and decode the block using the prediction block.

Clause 96: The device of clause 95, wherein to determine whether the motion information is for the sub-blocks or for the individual pixels, the processing system is configured to determine whether overlapped block motion compensation (OBMC) is to be applied to the block.

Clause 97: The device of clause 96, wherein the processing system is further configured to, when OBMC is to be applied, perform OBMC on internal sub-block boundaries of the sub-blocks and to perform local illumination compensation (LIC) to form the prediction block, without performing OBMC on outer boundaries of the block.

Clause 98: The device of clause 96, wherein to determine whether OBMC is to be applied to the block, the processing system is configured to, when multi-hypothesis prediction (MHP) is determined to be applied to the block, determine that OBMC is not to be applied to the block without decoding syntax elements related to OBMC for the block.

Clause 99: The device of clause 96, wherein to determine whether OBMC is to be applied to the block, the processing system is configured to determine a value of an OBMC syntax element, the value of the OBMC syntax element representing whether OBMC is to be applied to the block.

Clause 100: The device of clause 99, wherein the OBMC syntax element comprises an OBMC flag.

Clause 101: The device of clause 99, wherein the processing system is further configured to: determine a context for decoding the OBMC syntax element according to whether a picture including the block of video data is a low-delay picture or a non-low-delay picture; and context-based decode the OBMC syntax element using the determined context.

Clause 102: The device of clause 99, wherein the processing system is further configured to: determine a context for decoding the OBMC syntax element according to the data indicating that the block is to be predicted using affine motion compensation; and context-based decode the OBMC syntax element using the determined context.

Clause 103: The device of clause 96, wherein to determine whether OBMC is to be applied to the block, the processing system is configured to, when the block of has a size greater than a threshold, determine not to apply OBMC to the block.

Clause 104: The device of clause 95, wherein the device comprises one or more of a camera, a computer, a mobile device, a broadcast receiver device, or a set-top box.

Clause 105: A device for decoding video data, the device comprising: means for determining whether motion information of a block of video data is for sub-blocks of the block larger than individual pixels of the block or for the individual pixels, the block being associated with data indicating that the block is to be predicted using affine motion compensation; means for performing sub-block-based affine motion compensation to form a prediction block for the block in response to determining that the motion information of the block is for the sub-blocks; means for performing pixel-based affine motion compensation to form the prediction block for the block in response to determining that the motion information is for the individual pixels; and means for decoding the block using the prediction block.

Clause 106: A method of decoding video data, the method comprising: determining whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, performing sub-block-based affine motion compensation to form a prediction block for the block; in response to determining that the motion information is for the individual pixels, performing pixel-based affine motion compensation to form the prediction block for the block; and decoding the block using the prediction block.

Clause 107: The method of clause 106, wherein determining whether the motion information is for the sub-blocks or for the individual pixels comprises determining whether overlapped block motion compensation (OBMC) is to be applied to the block.

Clause 108: The method of clause 107, further comprising, when OBMC is to be applied, performing OBMC on internal sub-block boundaries of the sub-blocks and performing local illumination compensation (LIC) to form the prediction block, without performing OBMC on outer boundaries of the block.

Clause 109: The method of any of clauses 107 and 108, wherein determining whether OBMC is to be applied to the block comprises, when multi-hypothesis prediction (MHP) is determined to be applied to the block, determining that OBMC is not to be applied to the block without decoding syntax elements related to OBMC for the block.

Clause 110: The method of any of clauses 107 and 108, wherein determining whether OBMC is to be applied to the block comprises determining a value of an OBMC syntax element, the value of the OBMC syntax element representing whether OBMC is to be applied to the block.

Clause 111: The method of clause 110, wherein the OBMC syntax element comprises an OBMC flag.

Clause 112: The method of any of clauses 110 and 111, further comprising: determining a context for decoding the OBMC syntax element according to whether a picture including the block of video data is a low-delay picture or a non-low-delay picture; and context-based decoding the OBMC syntax element using the determined context.

Clause 113: The method of any of clauses 110 and 111, further comprising: determining a context for decoding the OBMC syntax element according to the data indicating that the block is to be predicted using affine motion compensation; and context-based decoding the OBMC syntax element using the determined context.

Clause 114: The method of any of clauses 107-113, wherein determining whether OBMC is to be applied to the block comprises, when the block of has a size greater than a threshold, determining not to apply OBMC to the block of video data.

Clause 115: The method of clause 114, wherein the size of the block of video data corresponds to one dimension of the block of video data, and wherein the threshold comprises 128 samples along the one dimension.

Clause 116: The method of clause 115, wherein the one dimension comprises one of a width of the block of video data or a height of the block of video data.

Clause 117: The method of any of clauses 106-116, wherein the block comprises a luminance block, the method further comprising performing pixel-based affine motion compensation for a chrominance block corresponding to the luminance block.

Clause 118: The method of any of clauses 106-117, further comprising, in response to determining that the motion information of the block is for the individual pixels, determining that prediction refinement with optical flow (PROF) is not to be performed on the block.

Clause 119: The method of clause 118, wherein determining that PROF is not to be performed comprises determining that PROF is not to be performed without decoding syntax elements related to PROF for the block.

Clause 120: The method of any of clauses 106-119, further comprising, in response to determining that the motion information of the block is for the sub-blocks, when a smallest sub-block of the sub-blocks has a size less than a threshold, determining that prediction refinement with optical flow (PROF) is not to be performed on the block.

Clause 121: The method of clause 120, wherein the size of the smallest sub-block corresponds to one dimension of the sub-block, and wherein the threshold is 4 samples.

Clause 122: The method of clause 121, wherein the one dimension comprises one of a height of the smallest sub-block or a width of the smallest sub-block.

Clause 123: The method of any of clauses 120-122, wherein determining that PROF is not to be performed comprises determining that PROF is not to be performed without decoding syntax elements related to PROF for the block.

Clause 124: The method of any of clauses 106-123, wherein the block comprises a first block and the prediction block comprises a first prediction block, the method further comprising: determining that a second block of the video data is not to be predicted using affine motion compensation; in response to determining that the second block of video data is not to be predicted using affine motion compensation, implicitly determining whether to apply overlapped block motion compensation (OBMC) to the second block of video data without decoding data indicating whether to apply OBMC to the second block of video data; forming a second prediction block for the second block of video data; and decoding the second block of video data using the second prediction block.

Clause 125: The method of any of clauses 106-124, wherein the data indicating that the block is to be predicted using affine motion compensation includes data indicating that the block of video data is to be predicted using an affine motion compensation mode other than merge prediction mode.

Clause 126: The method of any of clauses 106-125, wherein a current picture includes the block and the motion information refers to a reference picture, and wherein determining whether the motion information is for the sub-blocks or the individual pixels comprises: determining a difference between a picture order count (POC) for the current picture and a POC for the reference picture; and when the difference between the POC for the current picture and the POC for the reference picture is greater than a threshold, determining that the motion information is for the individual pixels.

Clause 127: The method of clause 126, wherein the threshold is a value of 1.

Clause 128: The method of any of clauses 106-126, wherein the block is included in a non-low-delay picture.

Clause 129: The method of any of clauses 106-128, further comprising encoding the current block prior to decoding the current block.

Clause 130: A device for decoding video data, the device comprising: a memory configured to store video data; and a processing system comprising one or more processors implemented in circuitry, the processing system being configured to: determine whether motion information of a block of video data is for sub-blocks of the block larger than individual pixels of the block or for the individual pixels, the block being associated with data indicating that the block is to be predicted using affine motion compensation; in response to determining that the motion information of the block is for the sub-blocks, perform sub-block-based affine motion compensation to form a prediction block for the block; in response to determining that the motion information is for the individual pixels, perform pixel-based affine motion compensation to form the prediction block for the block; and decode the block using the prediction block.

Clause 131: The device of clause 130, wherein to determine whether the motion information is for the sub-blocks or for the individual pixels, the processing system is configured to determine whether overlapped block motion compensation (OBMC) is to be applied to the block.

Clause 132: The device of clause 131, wherein the processing system is further configured to, when OBMC is to be applied, perform OBMC on internal sub-block boundaries of the sub-blocks and to perform local illumination compensation (LIC) to form the prediction block, without performing OBMC on outer boundaries of the block.

Clause 133: The device of any of clauses 131 and 132, wherein to determine whether OBMC is to be applied to the block, the processing system is configured to, when multi-hypothesis prediction (MHP) is determined to be applied to the block, determine that OBMC is not to be applied to the block without decoding syntax elements related to OBMC for the block.

Clause 134: The device of any of clauses 131 and 132, wherein to determine whether OBMC is to be applied to the block, the processing system is configured to determine a value of an OBMC syntax element, the value of the OBMC syntax element representing whether OBMC is to be applied to the block.

Clause 135: The device of clause 134, wherein the OBMC syntax element comprises an OBMC flag.

Clause 136: The device of any of clauses 134 and 135, wherein the processing system is further configured to: determine a context for decoding the OBMC syntax element according to whether a picture including the block of video data is a low-delay picture or a non-low-delay picture; and context-based decode the OBMC syntax element using the determined context.

Clause 137: The device of any of clauses 134 and 135, wherein the processing system is further configured to: determine a context for decoding the OBMC syntax element according to the data indicating that the block is to be predicted using affine motion compensation; and context-based decode the OBMC syntax element using the determined context.

Clause 138: The device of any of clauses 131-137, wherein to determine whether OBMC is to be applied to the block, the processing system is configured to, when the block of has a size greater than a threshold, determine not to apply OBMC to the block.

Clause 139: The device of any of clauses 130-138, wherein the device comprises one or more of a camera, a computer, a mobile device, a broadcast receiver device, or a set-top box.

Clause 140: A device for decoding video data, the device comprising one or more means for performing the method of any of clauses 106-129.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining whether motion information of a block of video data is for sub-blocks of the block larger than individual pixels of the block or for the individual pixels, wherein determining whether the motion information is for the sub-blocks or for the individual pixels comprises determining whether overlapped block motion compensation (OBMC) is to be applied to the block, the block being associated with data indicating that the block is to be predicted using affine motion compensation;

in response to determining that the motion information of the block is for the sub-blocks, performing sub-block-based affine motion compensation to form a prediction block for the block;

in response to determining that the motion information is for the individual pixels, performing pixel-based affine motion compensation to form the prediction block for the block; and decoding the block using the prediction block.

2. The method of claim 1, wherein determining whether OBMC is to be applied to the block comprises, when multi-hypothesis prediction (MHP) is determined to be applied to the block, determining that OBMC is not to be applied to the block without decoding syntax elements related to OBMC for the block.

3. The method of claim 2, wherein determining whether OBMC is to be applied to the block comprises determining whether OBMC is to be applied to the block according to whether OBMC was applied to a spatial neighbor to the block.

4. The method of claim 1, wherein determining whether OBMC is to be applied to the block comprises determining a value of an OBMC syntax element, the value of the OBMC syntax element representing whether OBMC is to be applied to the block.

5. The method of claim 4, wherein the OBMC syntax element comprises an OBMC flag.

6. The method of claim 4, further comprising:

determining a context for decoding the OBMC syntax element according to whether a picture including the block of video data is a low-delay picture or a non-low-delay picture; and context-based decoding the OBMC syntax element using the determined context.

7. The method of claim 4, further comprising:

determining a context for decoding the OBMC syntax element according to the data indicating that the block is to be predicted using affine motion compensation; and context-based decoding the OBMC syntax element using the determined context.

8. The method of claim 1, wherein determining whether OBMC is to be applied to the block comprises, when the block of has a size greater than a threshold, determining not to apply OBMC to the block of video data.

9. The method of claim 8, wherein the size of the block of video data corresponds to one dimension of the block of video data, and wherein the threshold comprises 128 samples along the one dimension.

10. The method of claim 9, wherein the one dimension comprises one of a width of the block of video data or a height of the block of video data.

11. The method of claim 1, wherein the block comprises a luminance block, the method further comprising performing pixel-based affine motion compensation for a chrominance block corresponding to the luminance block.

12. The method of claim 1, further comprising, in response to determining that the motion information of the block is for the individual pixels, determining that prediction refinement with optical flow (PROF) is not to be performed on the block.

13. The method of claim 12, wherein determining that PROF is not to be performed comprises determining that PROF is not to be performed without decoding syntax elements related to PROF for the block.

14. The method of claim 1, further comprising, in response to determining that the motion information of the block is for the sub-blocks, when a smallest sub-block of the sub-blocks has a size less than a threshold, determining that prediction refinement with optical flow (PROF) is not to be performed on the block.

15. The method of claim 14, wherein the block comprises a coding unit (CU).

16. The method of claim 14, wherein the size of the smallest sub-block corresponds to one dimension of the sub-block, and wherein the threshold is 4 samples.

17. The method of claim 16, wherein the one dimension comprises one of a height of the smallest sub-block or a width of the smallest sub-block.

18. The method of claim 14, wherein determining that PROF is not to be performed comprises determining that PROF is not to be performed without decoding syntax elements related to PROF for the block.

19. The method of claim 1, wherein the block comprises a first block and the prediction block comprises a first prediction block, the method further comprising:

determining that a second block of the video data is not to be predicted using affine motion compensation;

in response to determining that the second block of video data is not to be predicted using affine motion compensation, implicitly determining whether to apply overlapped block motion compensation (OBMC) to the second block of video data without decoding data indicating whether to apply OBMC to the second block of video data;

forming a second prediction block for the second block of video data; and decoding the second block of video data using the second prediction block.

20. The method of claim 1, wherein the data indicating that the block is to be predicted using affine motion compensation includes data indicating that the block of video data is to be predicted using an affine motion compensation mode other than affine merge mode.

21. The method of claim 1, wherein a current picture includes the block and the motion information refers to a reference picture, and wherein determining whether the motion information is for the sub-blocks or the individual pixels comprises:

determining a difference between a picture order count (POC) for the current picture and a POC for the reference picture; and when the difference between the POC for the current picture and the POC for the reference picture is greater than a threshold, determining that the motion information is for the individual pixels.

22. The method of claim 21, wherein the threshold is a value of 1.

23. The method of claim 1, wherein the block is included in a non-low-delay picture.

24. The method of claim 1, further comprising encoding the current block prior to decoding the current block.

25. A device for decoding video data, the device comprising:

a memory configured to store video data; and a processing system comprising one or more processors implemented in circuitry, the processing system being configured to:

determine whether motion information of a block of the video data is for sub-blocks of the block larger than individual pixels of the block or for the individual pixels, wherein to determine whether the motion information is for the sub-blocks or for the individual pixels, the processing system is configured to determine whether overlapped block motion compensation (OBMC) is to be applied to the block, the block being associated with data indicating that the block is to be predicted using affine motion compensation;

in response to determining that the motion information of the block is for the sub-blocks, perform sub-block-based affine motion compensation to form a prediction block for the block;

in response to determining that the motion information is for the individual pixels, perform pixel-based affine motion compensation to form the prediction block for the block; and decode the block using the prediction block.

26. The device of claim 25, wherein to determine whether OBMC is to be applied to the block, the processing system is configured to, when multi-hypothesis prediction (MHP) is determined to be applied to the block, determine that OBMC is not to be applied to the block without decoding syntax elements related to OBMC for the block.

27. The device of claim 26, wherein to determine whether OBMC is to be applied to the block, the processing system is configured to determine whether OBMC was applied to a spatial neighbor to the block.

28. The device of claim 25, wherein to determine whether OBMC is to be applied to the block, the processing system is configured to determine a value of an OBMC syntax element, the value of the OBMC syntax element representing whether OBMC is to be applied to the block.

29. The device of claim 28, wherein the OBMC syntax element comprises an OBMC flag.

30. The device of claim 28, wherein the processing system is further configured to:

determine a context for decoding the OBMC syntax element according to whether a picture including the block of video data is a low-delay picture or a non-low-delay picture; and context-based decode the OBMC syntax element using the determined context.

31. The device of claim 28, wherein the processing system is further configured to:

determine a context for decoding the OBMC syntax element according to the data indicating that the block is to be predicted using affine motion compensation; and context-based decode the OBMC syntax element using the determined context.

32. The device of claim 25, wherein to determine whether OBMC is to be applied to the block, the processing system is configured to, when the block of has a size greater than a threshold, determine not to apply OBMC to the block.

33. The device of claim 25, wherein the device comprises one or more of a camera, a computer, a mobile device, a broadcast receiver device, or a set-top box.

34. A device for decoding video data, the device comprising:

means for determining whether motion information of a block of video data is for sub-blocks of the block larger than individual pixels of the block or for the individual pixels, wherein the means for determining whether the motion information is for the sub-blocks or for the individual pixels comprises means for determining whether overlapped block motion compensation (OBMC) is to be applied to the block, the block being associated with data indicating that the block is to be predicted using affine motion compensation;

means for performing sub-block-based affine motion compensation to form a prediction block for the block in response to determining that the motion information of the block is for the sub-blocks;

means for performing pixel-based affine motion compensation to form the prediction block for the block in response to determining that the motion information is for the individual pixels; and means for decoding the block using the prediction block.

* * * * *